US011900792B2

(12) United States Patent
Adams et al.

(10) Patent No.: US 11,900,792 B2
(45) Date of Patent: *Feb. 13, 2024

(54) ENHANCED ALERT GENERATION SYSTEM BASED ON REAL-TIME MANIPULATION OF DATASETS

(71) Applicant: Palantir Technologies Inc., Denver, CO (US)

(72) Inventors: Scott Adams, London (GB); Arthur Kam, Killara (AU); Meredith Bertasi, New York, NY (US); Mitchell Skiles, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/181,403

(22) Filed: Mar. 9, 2023

(65) Prior Publication Data
US 2023/0282097 A1 Sep. 7, 2023

Related U.S. Application Data

(63) Continuation of application No. 17/804,164, filed on May 26, 2022, now Pat. No. 11,626,009, which is a (Continued)

(51) Int. Cl.
*G08B 29/22* (2006.01)
*G08B 5/22* (2006.01)
(Continued)

(52) U.S. Cl.
CPC ......... *G08B 29/22* (2013.01); *G06F 3/04847* (2013.01); *G06F 16/2457* (2019.01); *G06F 16/252* (2019.01); *G08B 5/22* (2013.01)

(58) Field of Classification Search
CPC ....... G08B 29/22; G08B 5/22; G06F 3/04847; G06F 16/2457; G06F 16/252;
(Continued)

(56) References Cited

U.S. PATENT DOCUMENTS

| 11,348,448 B1 | 5/2022 | Adams et al. |
| 11,626,009 B2 | 4/2023 | Adams et al. |
| 2022/0201030 A1 | 6/2022 | Petit et al. |

OTHER PUBLICATIONS

U.S. Appl. No. 17/445,172, Enhanced Machine Learning Refinement and Alert Generation System, filed Aug. 16, 2021.

*Primary Examiner* — Angie Badawi
(74) *Attorney, Agent, or Firm* — Knobbe, Martens, Olson & Bear, LLP

(57) ABSTRACT

Systems and methods are provided for enhanced alert generation based on real-time manipulation of datasets. An example method includes accessing datasets including a plurality of rows each indicating a plurality of values. Occurrences of alert definitions are monitored via applying the alert definitions to the datasets, the alert definitions specifying expressions utilizing one or more of the values, with an occurrence of an alert definition indicating satisfaction of the specified expression and causing an associated alert to be generated for evaluation. Presentation of an interactive user interface associated with customizing alert definitions is caused. The interactive user interface presents a first visual portion, the first visual portion enabling specification of an expression for a customized alert definition. The interactive user interface presents a second visual portion, the second visual portion comparing occurrences of an existing alert definition with occurrences of a customized alert definition specified in the first visual portion.

20 Claims, 15 Drawing Sheets

Related U.S. Application Data continuation of application No. 16/177,114, filed on Oct. 31, 2018, now Pat. No. 11,348,448.

(51) Int. Cl.
*G06F 3/04847* (2022.01)
*G06F 16/25* (2019.01)
*G06F 16/2457* (2019.01)

(58) Field of Classification Search
CPC ........ G06F 3/0481; G06N 3/08; G06N 20/00; H04L 43/16; H04L 41/064; H04L 41/069; H04L 41/22; H04L 43/045; H04L 63/14
See application file for complete search history.

ENHANCED ALERT GENERATION SYSTEM BASED ON REAL-TIME MANIPULATION OF DATASETS

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

TECHNICAL FIELD

The present disclosure relates to systems and techniques for data integration, analysis, and visualization. More specifically, the present disclosure relates to enhanced alert generation and comparison techniques.

BACKGROUND

With the continual increase in the volume of data being generated, identifying specific features or occurrences within the data may present great technological hurdles. Examples of data may include network logs, computer system logs, and so on. These logs may be generated in response to users utilizing a networked computing environment associated with an entity. Due to the size, and frequency of generation, of the logs, in general the entity may discard the logs or adjust them to reduce their size (e.g., remove subsets of the data). However, the above-described data may include network security information of technical or investigatory importance. For example, included in the logs may be evidence of improper access to the networked computing environment. Since the entity may have hundreds of thousands, or millions, of users, it may be impractical to analyze the logs to determine the improper accesses.

SUMMARY

Particular embodiments of the subject matter described in this specification can be implemented so as to realize one or more of the following advantages. A system described herein can rapidly analyze large datasets and generate alerts for consumption based on the analyses. To aid in defining an alert, the system can advantageously present efficient user interfaces which enable users to experiment with definitions of alerts. For example, a user may specify an alert definition which causes specific features of the datasets to be analyzed, aggregated, and so on. As will be described the system may, in real-time (e.g., substantially real-time), present summary information related to the specified alert definition. Example summary information may include an indication of a number of alerts which would have been generated based on the alert definition (e.g., within a threshold or user-selectable time period). The user may then adjust the alert definition, and the system may present comparisons between the initially defined alert definition and the adjusted alert definition. In this way, the user may efficiently experiment with alert definitions. Advantageously, the user may cause a particular alert definition to be put into production (e.g., via a single user input, such as a 'one-click' implementation). For example, the system may monitor for future occurrences of the particular alert definition.

It should be appreciated that datasets may be largely impenetrable, and current schemes to determine important information inadequate. A first example scheme may enable a user to specify particular information, which if detected, can cause an alert to be generated. For example, the user may indicate that if a particular computer system is accessed, or a particular user account is accessed, and so on, then an alert is to be generated. In this way, an example system implementing the first example scheme may search for simple expressions in the datasets. Thus, with a large networked computing environment the example system may provide a modicum of alerting capabilities.

However, the first example scheme may fail to identify complex events. Certain complex events may be quite time-sensitive, such that missing an occurrence of a complex event may result in technical failures. As an example, a complex event may be based on a multitude of information spread throughout different logs. The complex event may therefore require a robust analysis of the information, such as via machine learning techniques, or complex mathematical analyses. An example complex event may include correlating amongst the actions of 5, 10, 1000 users. In this example, the complex event may include the users performing specific actions, optionally at specific times, that result in a coordinated attempt to improperly access a network. Additionally, the complex event may require earlier analyses of one or more of the users, devices from which they access a network, and so on. Thus, the first example scheme may be unable to analyze the volume of data to determine this complex event.

Additionally, schemes usable by users to identify the above-described complex event may be inadequate. Thus, even with a system which could analyze the volume data, a user may be unable to (1) identify the features of the complex event, and (2) specify an alert definition to determine occurrences of the complex event. For example, the user may be unable to quickly identify that the complex event caused an associated outcome.

The system described herein may advantageously utilize a data pipeline to process raw data sources into an ontology. Alert definitions may then be specified by users via leveraging the ontology. For example, the ontology may enable classification of information included in the raw data sources into different object types. Example object types may include users, systems, transactions, and so on. An alert definition may thus be customized based on the different object types. Additionally, transforms and complex analyses may be specified, and may different stages of processing to be applied to the raw datasets. For example, an alert definition can cause a first processing of multitudes of data sources, and then cause one or more additional processing steps to be applied to the first processing. In this way, a user may leverage powerful analyses and processing capabilities via simple expressions included in alert definitions.

As described above, user interfaces may be utilized by users to experiment with alert definitions. Due to the enhanced processing of the raw data sources, via the data pipeline, the system described herein may quickly present information enabling users to determine an efficacy of the alert definitions. For example, comparisons between alert definitions may be graphically presented (e.g., a comparison between two different versions of an alert definition). In this way, the user may customize (herein also referred to as 'adjust') an alert definition until the alert definition surfaces previously hidden events.

Thus, the techniques described herein address technological problems and improve the functioning of the computer. Being able to extract, and determine information from, raw datasets may be paramount to performing different technological functions. For example, network security may require the rapid generation of alerts to guard against tampering with a network. Therefore, alert definitions may improve upon network security and thus the functioning of the computers themselves. However, there is currently no scheme to enable adjustments of alert definitions and view real-time comparisons associated with the adjustments. As will be described in FIGS. 7A-7D and 8B-8C, example user interfaces may mask deep functionality, such that users may quickly mock up alert definitions for monitoring.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying report-related information and may enable a user to more quickly access, navigate, assess, and digest such information than previous systems.

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g. forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above-and/or below-described embodiments (including one or more aspects of the appended claims).

In various embodiments, computer-implemented methods are disclosed in which, by one or more processors executing program instructions, one or more aspects of the above-and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Overview

Figure 1:
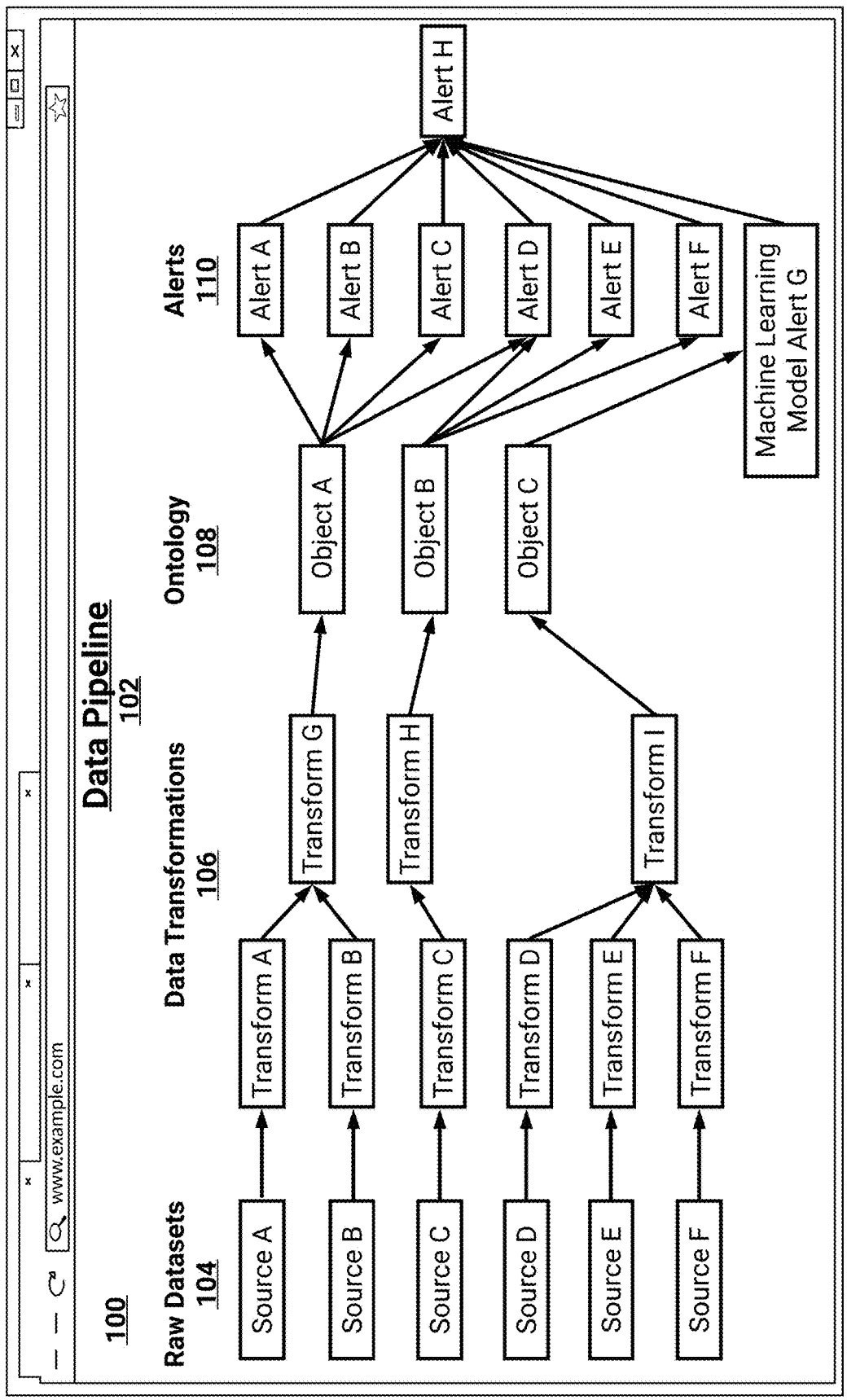
FIG. 1 illustrates an example user interface presenting a graphical depiction of a data pipeline according to the techniques described herein

This specification describes, among other things, the rapid interrogation and improvement of alerts automatically generated by a system based on deep analyses of datasets. For example, the system may be the alert comparison and optimization system 400 described in more detail below. It should be appreciated that data is continuously expanding both in scope and size. For example, an entity may now have greater access to data (e.g., an increasing number of systems, devices, and so on, may generate logs or records) and, also, the data itself may be increasing in size. Spread throughout datasets may be events, or combinations of features, to which the entity would prefer being alerted. However, given the quantity of data the entity may be unable. Further complicating detection of these events is a lack of schemes to reduce the complexity in analyzing the data. With respect to the example of alerts, techniques to define alerts are inadequate for the modern data landscape.

As will be appreciated, datasets may be stored in databases. The information included in the datasets may thus represent respective rows of database tables. Therefore, a first example scheme to define an alert may include utilizing a query language to create a complex expression of joins, filtering steps, and so on, to extract information from the datasets. However, this first example scheme introduces great complexity into defining the alert. For example, datasets may be modified over time (e.g., different column names, different number of columns, different types or forms of information included in each row, and so on). Thus, in the first example scheme the query language may be inadequate to address these modifications without unwieldy oversight. These inadequacies may thus result in users being limited to maintaining a limited quantity of alerts.

Advantageously, and as will be described, a second example scheme to define an alert may be based on a data pipeline (e.g., illustrated in FIG. 1, and described below). The second example scheme may include graphically enabling users to utilize a rich language based on object types defined by an ontology. For example, a user may utilize an interactive user interface to define the alert. Based on interactions with the user interface, the user may leverage a series of previously-defined, or user-definable, expressions to create a complex alert definition which utilizes the object types. Based on the data pipeline, these object types may be automatically extracted from the datasets via data transformations. For example, specific datasets may include information indicative of networks actions of user accounts. Thus, the user accounts may represent an object type extracted from the specific datasets. In this way, a user may define an alert through direct reference to the user accounts and one or more logical and/or mathematical expressions.

An example user interface may include elements for defining an alert (herein referred to as specifying an alert definition). As described above, an alert definition may indicate one or more expressions, object types, and so on. Example object types may include a user account, an entity, a unique identifier, and any arbitrary classifiable abstraction described in one or more datasets. An expression may define one or more mathematical or logical operations to be applied to data included in datasets. An expression may optionally be defined (e.g., by a user) using one or more programming languages and may specify particular datasets. Example expressions may include filtering data, determining a moving average of specific types of values, and so on.

As described above, the datasets may be stored as database tables in one or more databases or storage systems. Optionally, the system may generate an expression dataset for an expression. The expression dataset may be stored as a separate database table or included as one or more columns in a prior dataset. In this example, the system may generate values for the expression based on values included in the database tables which are implicated by the expression. These generated values may thus be included in the expression dataset. As an example, an expression dataset may include values identifying a moving average of specific values included in the database tables. A user may thus specify combinations of expressions, and the values included in the expression datasets may be utilized. In this way, a user may specify one or more expressions that causes emergent patterns to form from the datasets. An alert definition may then be specified which is based, at least in part, on the pattern.

Thus, a user may quickly specify an alert definition and cause occurrences of the alert definition to be monitored. As utilized herein, an occurrence of an alert definition may represent satisfaction of the object types and expressions specified in the alert definition. For example, an alert definition may cause generation of an alert if a threshold number of user accounts access a same networked device within a threshold amount of time. Thus, in this example an occurrence of an alert definition indicates satisfaction of a Boolean expression.

As an example of identifying occurrences of an alert definition, an entity may maintain a networked computing environment for its employees to utilize. In this example, the entity may prefer identifying suspicious events. An example suspicious event may include an employee obtaining a document from a networked storage server and emailing the document to a personal account. In this example, a first dataset may record accesses to network storage. Additionally, a second dataset may record information from an email server. The entity may therefore specify an alert definition that indicates (1) an object type associated with employees and (2) expressions which utilize the first dataset and second dataset. The system described herein may monitor for occurrences of the alert definition and generate corresponding alerts.

Advantageously, the system can allow users to adjust alert definitions to ascertain an optimal (e.g., substantially optimal) definition. As will be described in more detail below, with respect to FIGS. 6-7D, a user of the system may identify that an alert definition is not generating as many alerts as anticipated. For example, the alert definition may be causing the system to miss generating alerts for suspicious events. An example user interface described herein may enable comparisons between a previously specified alert definition and a new alert definition. For example, the new definition may be customized or adjusted based on the previously specified alert definition.

As will be described, a comparison between a previously specified alert definition and an adjusted alert definition may be graphically represented. For example, a number of alerts which were generated based on the previously specified alert definition may be presented. Similarly, a number of alerts which would have been generated based on the adjusted alert definition may be presented. Optionally, users of the system may review generated alerts and indicate whether each alert is assigned an alert type comprising a (1) false positive, (2) suspicious, or (3) not suspicious. With respect to the comparison, the system may graphically indicate an extent to which the adjusted alert definition increases, or decreases, the alert types. For example, the system may indicate a number of each alert type for the previously specified alert definition. In this example, the system may also graphically indicate a number of each alert type for the adjusted alert definition. The system may determine which of the alerts for the adjusted alert definition have been previously generated (e.g., via the previously specified alert definition, or a different alert definition). The system may then determine the alert types for these determined alerts.

Optionally, the system may indicate an extent to which the generated alerts for the adjusted alert definition have not yet been assigned an alert type. These alerts may represent new alerts. Advantageously, the system can enable the user to drill down into these alerts. Through examination of the alerts, the user can determine whether the adjusted alert definition is superior to the previously specified alert definition (e.g., more accurately identifies suspicious events, for example with less false positives).

Data Pipeline

FIG. 1 illustrates an example user interface 100 presenting a graphical depiction of a data pipeline 102 according to the techniques described herein. As described above, the data pipeline 102 can enable the processing of raw datasets 104 into an ontology 108. The data pipeline 102 can then enable generation of alerts 110. User interface 100 may be an example of an interactive user interface presented on a user device of a user. Example user devices may include a laptop, a tablet, a mobile device, a wearable device, and so on.

Optionally, the user interface 100 may be a web page generated, at least in part, by a system (e.g., the alert comparison and optimization system 400 described below). The web page may be provided for presentation to the user device via a network (e.g., the internet, a wide or local area network, and so on). In some embodiments, the system may implement a web application. Thus, interactions with the user interface 100 may be routed to the system for processing. The system may then cause the user interface 100 to be updated in response. In some embodiments, the user interface 100 may be generated, at least in part, by an application executing on the user device. For example, the application may be an 'app' obtained from an electronic application store. In this example, the graphical elements included in the user interface 100 may be rendered by the application. Optionally, information may be obtained from the system and included in the user interface 100. For example, the specific details of the data pipeline 102 may be obtained from the system.

As illustrated in FIG. 1, the data pipeline 102 includes a graphical representation of raw datasets 104. The data pipeline 102 further includes a graphical representation of data transformations 106 to be applied to the raw datasets 106. The data pipeline 102 further includes a graphical representation of an ontology 108 which causes object types to be extracted based on the data transformations 106. The data pipeline 102 further includes a graphical representation of alerts 110, which may be generated based on occurrences of associated alert definitions.

With respect to the raw datasets 104, the raw datasets 104 may reflect information recording disparate events, transactions, user actions, and so on. As an example, the raw datasets 104 may record accesses to one or more networks by users. In this example, the raw datasets 104 may record timestamps associated with the accesses, identifying information of user devices utilized to access the networks, user account information for the accesses, and so on. As another example, the raw datasets 104 may record transactions. An example transaction may include financial transactions. Another example transaction may include blockchain transactions. These raw datasets 104 may thus record disparate features. Optionally, the raw datasets 104 may be obtained as database tables. In this example, each row of a database table may indicate one or more features with the features being identified according to the columns of the database table.

In the example of FIG. 1, the raw datasets 104 are obtained from multitudes of sources. For example, the raw datasets 104 include Source A-F. These different sources may include distinct information. For example, Source A may have been generated by a domain controller which responds to security authentication requests. As another example, Source B may have been generated by user devices and reflect user actions taken on the user devices. Thus, these sources may include information which is relevant to potential suspicious events being monitored by the system (e.g., based on the alerts 110).

Optionally, the user interface 100 may be interactive. In this example, a user of the user interface 100 may select (e.g., via user input) specific sources to be included in the raw datasets 104. For example, a user may select a selectable option associated with specifying sources for the raw datasets 104. The system may enable access to the underlying sources. For example, the system may obtain datasets from a specified source via a network connection.

It should be appreciated that data transformations 106 may refer to any operations performable on data, for example data stored in a dataset or database table. Examples of data transformations 106 may include adding a new column, removing a row, modifying a value, and so on. For example, the data transformations 106 may be utilized to extract object types from the raw datasets 104. As an example, data transformations 106 may cause aggregation of information associated with respective user accounts referenced in the raw datasets 104. As illustrated in FIG. 1, Data Transformations A-F are illustrated as feeding into Data Transformations G-I. Thus, the data transformations 106 may optionally be chained. In this example, Data Transformation A may transform Source A according to one or more techniques. Similarly, Data Transformation B may transform Source B. Data Transformation G may then utilize the information from Data Transformations A-B to determine Object A. Similar to the above, the user interface 100 may enable specification of the data transformations 106. For example, a user may indicate particular data transformations to be applied to the values included in Source A. An example data transformation may include aggregating all rows which relate to a same user account.

With respect to the ontology 108, Objects A-C may represent distinct object types extracted from the raw datasets 104. Example object types may include a user account, specific network actions taken by one or more user accounts, internet protocol (IP) addresses of user devices, locations from which a network was accessed, and so on. An example object type may further include an entity involved in a transaction. An example object type may further include a transaction. In this example, the transaction may be referenced in different sources of the raw datasets 104. Thus, information for each transaction may be aggregated from the raw datasets 104. In this way, all aggregated information for a transaction may be accessed Optionally, user interface 100 may respond to user input directed to one of the objects included in the ontology 108. For example, a user may select 'Object A' via user input to user interface 100. In response, user interface 100 may update to reflect the unique objects included in object type A. For example, an indication of all user accounts that are reflected in the raw datasets 104 may be presented.

With respect to alerts 110, each alert may be associated with an alert definition. As described herein, an alert definition may specify object types (e.g., Objects A-C) and one or more expressions. Optionally an alert definition may only specify an object type, or only specify an expression. Optionally, an alert definition may specify expressions and particular columns or rows of particular database tables. Examples of specifying an alert definition are included below, with respect to FIGS. 6-7D. The system may monitor for occurrences of each alert definition (e.g., Alerts A-H). Optionally, user interface 100 may respond to user input directed to one or more of the alerts 110. As will be described, the system may generate alerts for each occurrence of a particular alert definition. These generated alerts may optionally be stored in one or more database tables. Thus, a user may select a particular alert (e.g., Alert A). The user interface 100 may then update to identify the generated alerts for Alert A. Optionally an example alert, described below with respect to FIG. 9, may be based on machine learning techniques.

Optionally, summary information associated with a selected alert may be presented. Example summary information may include a quantity of alerts generated in different time periods (e.g., every month, every week, a user-selectable amount of time, and so on). In this example, the summary information may be a chart which plots the quantity of alerts against time. Example summary information may further include an indication of whether each alert was assigned as being (1) a false positive, (2) corresponding to a suspicious event, or (3) not corresponding to a suspicious event. While the description above indicated three example alert types, it should be understood that the alert types may be user-definable.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Person, Event, Document, Transaction, User Account, Entity). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Alert Definition: A definition specified by a user, or automatically by a system, that indicates one or more of the object types and one or more expressions. A system can utilize the alert definition to determine occurrences of the alert definition. For each occurrence, the system can generate an alert (e.g., to be provided to a user, or for later review by a user).

Expression: A mathematical or logical expression which utilizes data stored in one or more datasets. The expression may cause evaluation of the data according to the mathematical or logical statements. Optionally, the expression may cause generation of an expression dataset which includes values generated by the expression. Optionally, the expression may cause generation of one or more columns in a dataset which includes values generated by the expression.

Object-Centric Data Model

To provide a framework for the following discussion of specific systems and methods described herein, an example database system 210 using an ontology 205 will now be described. This description is provided for the purpose of providing an example and is not intended to limit the techniques to the example data model, the example database system, or the example database system's use of an ontology to represent information.

In one embodiment, a body of data is conceptually structured according to an object-centric data model represented by ontology 205. The conceptual data model is independent of any particular database used for durably storing one or more database(s) 209 based on the ontology 205. For example, each object of the conceptual data model may correspond to one or more rows in a relational database or an entry in Lightweight Directory Access Protocol (LDAP) database, or any combination of one or more databases.

Figure 2:
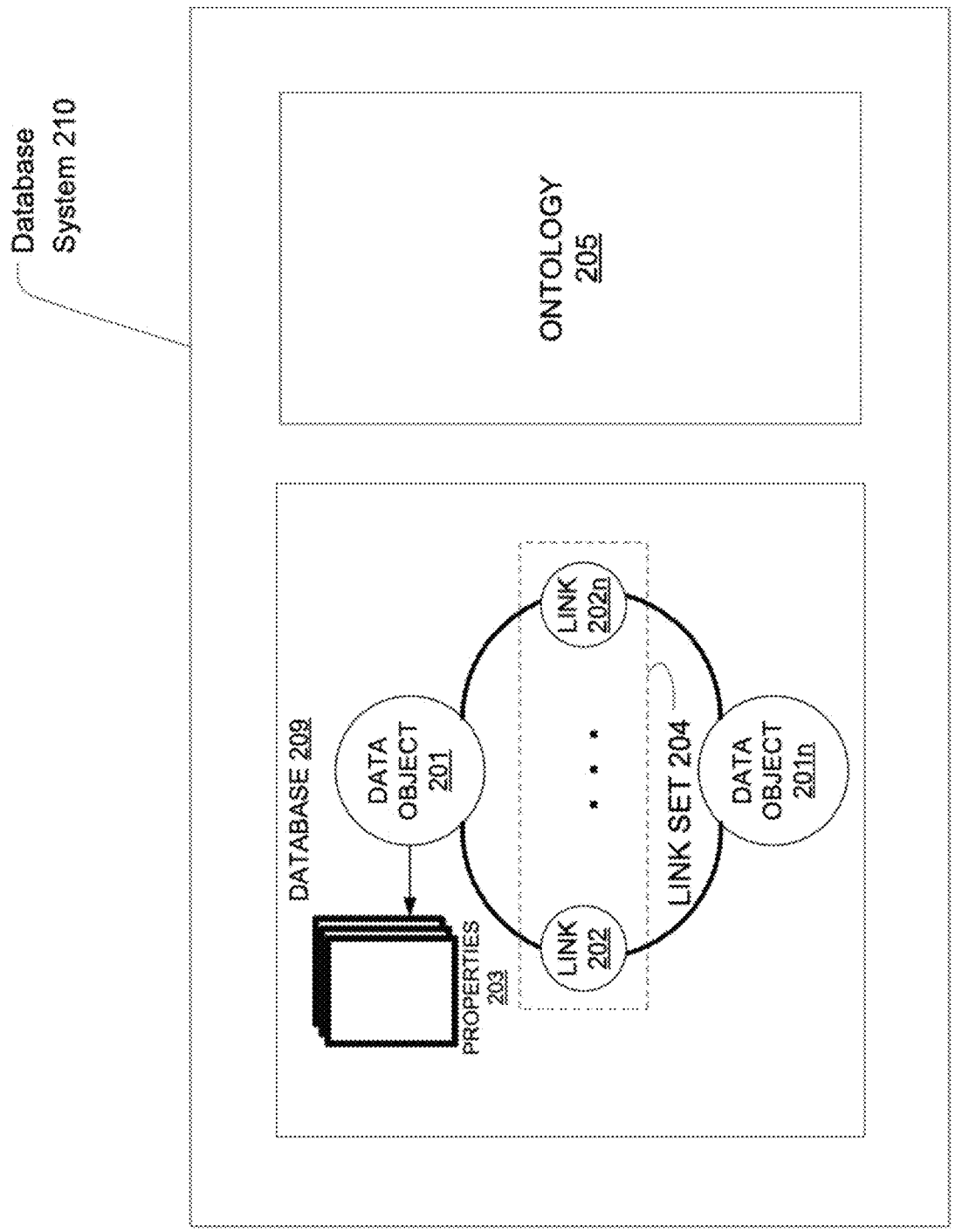
FIG. 2 illustrates one embodiment of a database system using an ontology.

FIG. 2 illustrates an object-centric conceptual data model according to an embodiment. An ontology 205, as noted above, may include stored information providing a data model for storage of data in the database 209. The ontology 205 may be defined by one or more object types, which may each be associated with one or more property types. At the highest level of abstraction, data object 201 is a container for information representing things in the world. For example, data object 201 can represent an entity such as a person, a place, an organization, a market instrument, or other noun. Data object 201 can represent an event that happens at a point in time or for a duration. Data object 201 can represent a document or other unstructured data source such as an e-mail message, a news report, or a written paper or article. Each data object 201 is associated with a unique identifier that uniquely identifies the data object within the database system.

Different types of data objects may have different property types. For example, a "Person" data object might have an "Eye Color" property type and an "Event" data object might have a "Date" property type. Each property 203 as represented by data in the database system 210 may have a property type defined by the ontology 205 used by the database 205.

Objects may be instantiated in the database 209 in accordance with the corresponding object definition for the particular object in the ontology 205. For example, a specific monetary payment (e.g., an object of type "event") of US$30.00 (e.g., a property of type "currency") taking place on Mar. 27, 2009 (e.g., a property of type "date") may be stored in the database 209 as an event object with associated currency and date properties as defined within the ontology 205. The data objects defined in the ontology 205 may support property multiplicity. In particular, a data object 201 may be allowed to have more than one property 203 of the same property type. For example, a "Person" data object might have multiple "Address" properties or multiple "Name" properties.

Each link 202 represents a connection between two data objects 201. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 201 can have multiple links with another data object 201 to form a link set 204. For example, two "Person" data objects representing a husband and a wife could be linked through a "Spouse Of" relationship, a matching "Address" property, and one or more matching "Event" properties (e.g., a wedding). Each link 202 as represented by data in a database may have a link type defined by the database ontology used by the database.

Figure 3:
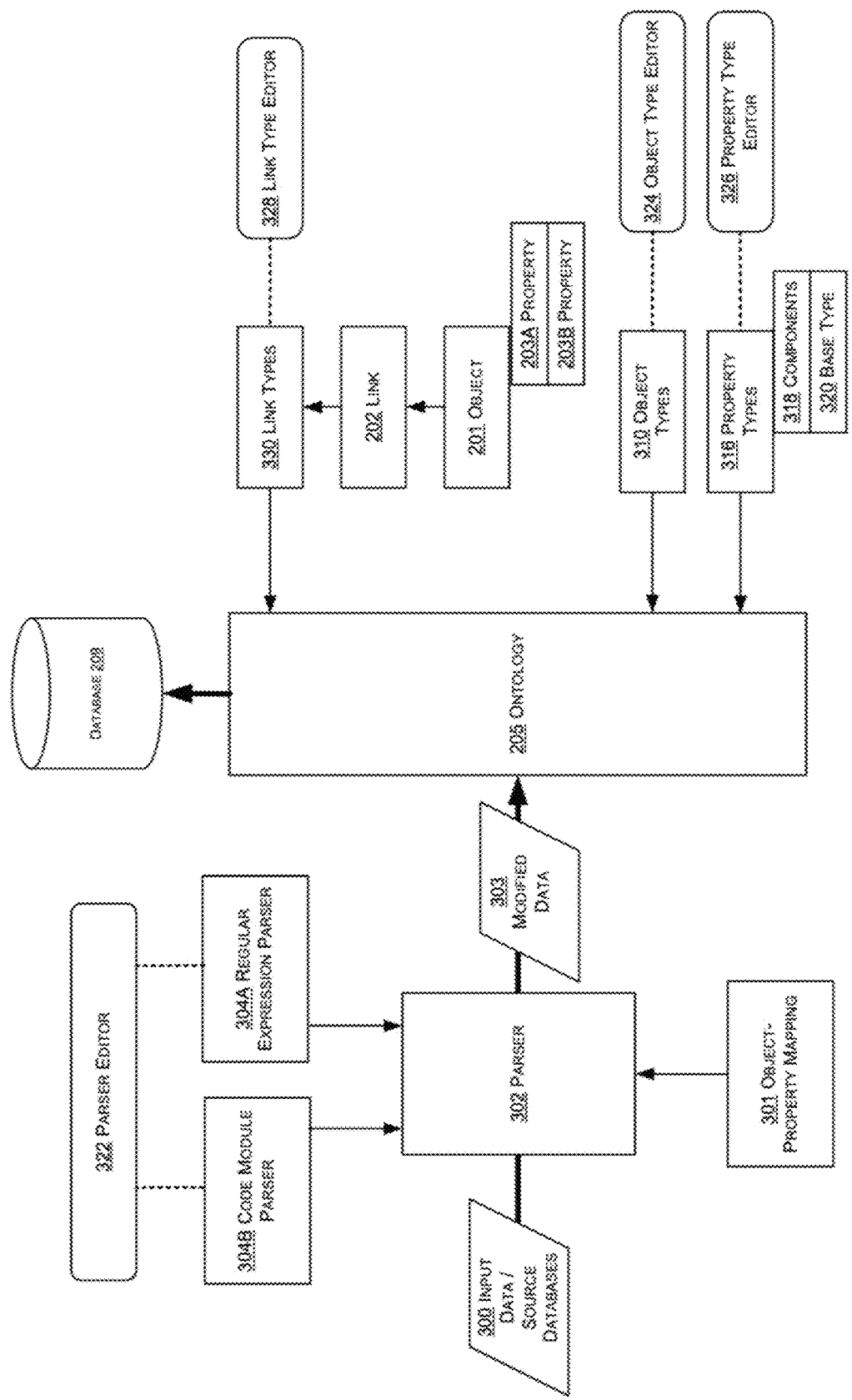
FIG. 3 illustrates one embodiment of a system for creating data in a data store using a dynamic ontology.

FIG. 3 is a block diagram illustrating exemplary components and data that may be used in identifying and storing data according to an ontology. In this example, the ontology may be configured, and data in the data model populated, by a system of parsers and ontology configuration tools. In the embodiment of FIG. 3, input data 300 is provided to parser 302. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 302 is able to read a variety of source input data types and determine which type of data it is reading.

In accordance with the discussion above, the example ontology 205 comprises stored information providing the data model of data stored in database 209, and the ontology is defined by one or more object types 310, one or more property types 316, and one or more link types 330. Based on information determined by the parser 302 or other mapping of source input information to object type, one or more data objects 201 may be instantiated in the database 209 based on respective determined object types 310, and each of the objects 201 has one or more properties 203 that are instantiated based on property types 316. Two data objects 201 may be connected by one or more links 202 that may be instantiated based on link types 330. The property types 316 each may comprise one or more data types 318, such as a string, number, etc. Property types 316 may be instantiated based on a base property type 320. For example, a base property type 320 may be "Locations" and a property type 316 may be "Home."

In an embodiment, a user of the system uses an object type editor 324 to create and/or modify the object types 310 and define attributes of the object types. In an embodiment, a user of the system uses a property type editor 326 to create and/or modify the property types 316 and define attributes of the property types. In an embodiment, a user of the system uses link type editor 328 to create the link types 330. Alternatively, other programs, processes, or programmatic controls may be used to create link types and property types and define attributes, and using editors is not required.

In an embodiment, creating a property type 316 using the property type editor 326 involves defining at least one parser definition using a parser editor 322. A parser definition comprises metadata that informs parser 302 how to parse input data 300 to determine whether values in the input data can be assigned to the property type 316 that is associated with the parser definition. In an embodiment, each parser definition may comprise a regular expression parser 304A or a code module parser 304B. In other embodiments, other kinds of parser definitions may be provided using scripts or other programmatic elements. Once defined, both a regular expression parser 304A and a code module parser 304B can provide input to parser 302 to control parsing of input data 300.

Using the data types defined in the ontology, input data 300 may be parsed by the parser 302 determine which object type 310 should receive data from a record created from the input data, and which property types 316 should be assigned to data from individual field values in the input data. Based on the object-property mapping 301, the parser 302 selects one of the parser definitions that is associated with a property type in the input data. The parser parses an input data field using the selected parser definition, resulting in creating new or modified data 303. The new or modified data 303 is added to the database 209 according to ontology 205 by storing values of the new or modified data in a property of the specified property type. As a result, input data 300 having varying format or syntax can be created in database 209. The ontology 205 may be modified at any time using object type editor 324, property type editor 326, and link type editor 328, or under program control without human use of an editor. Parser editor 322 enables creating multiple parser definitions that can successfully parse input data 300 having varying format or syntax and determine which property types should be used to transform input data 300 into new or modified input data 303.

Example Block Diagrams

Figure 4:
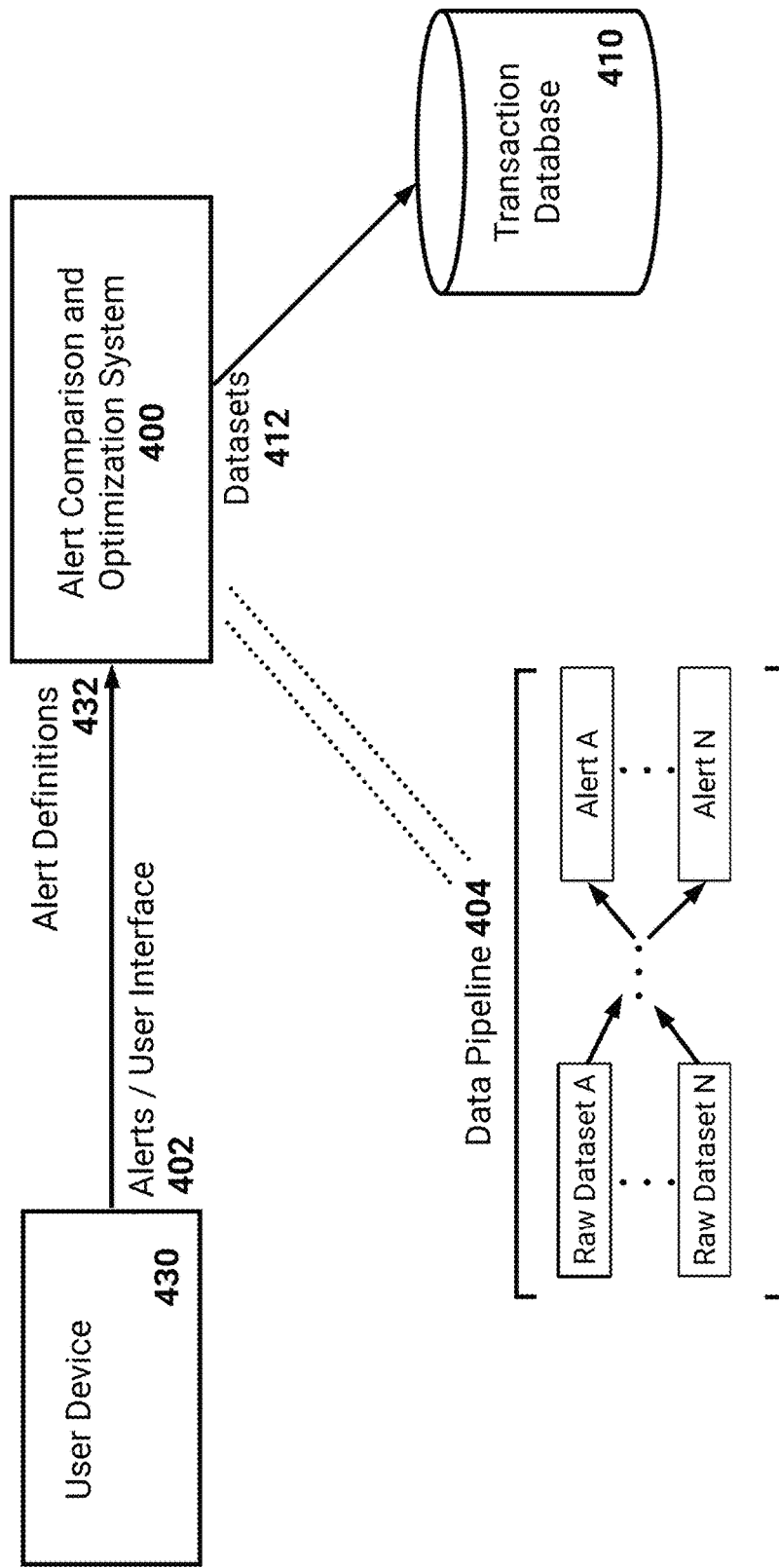
FIG. 4 illustrates a block diagram of an example alert comparison and optimization system.

FIG. 4 illustrates a block diagram of an example alert comparison and optimization system 400. The alert comparison and optimization system 400 may be a system of one or more computers and/or one or more processors, a system of one or more virtual machines executing on a system of one or more computers and/or one or more processors, and so on. As described above, the alert comparison and optimization system 400 may generate alerts 402 based on alert definitions 432. As will be described, the alert comparison and optimization system 400 may enable real-time (e.g., substantially real-time) feedback regarding adjustments to an alert definition. For example, the feedback may be presented in an interactive user interface 402 presented via a user device 430. As described above, an example user device 430 may include a laptop, computer, thin client, wearable device, mobile device, tablet, and so on.

As illustrated in FIG. 4, the alert comparison and optimization system 400 receives alert definitions 432 from the user device 430. A user of the user device 430 may utilize a user interface 402 to specify one or more object types and/or one or more expressions that form an alert definition. As described in FIG. 1, the expressions may utilize information included in datasets obtained by the alert comparison and optimization system 400. For example, the datasets may be stored in transaction database 410. These datasets may include particular features, for example indications of user accounts, time stamps, entities, and so on. Thus, the expressions may be mathematical and/or logical expressions applied to one or more of the features. An example expression is described below and illustrated in FIG. 7C.

The alert definitions 432 may be specified with reference to a data pipeline 404. Description of an example data pipeline is included above, with respect to FIG. 1. Thus, an alert definition may leverage the object types determined by the system 400 based on an ontology defined, at least in part, via the data pipeline 404. Additionally, the alert comparison and optimization system 400 may update the data pipeline 404 to reflect the received alert definitions 432. For example, user device 430 may provide a first alert definition to the system 400. A different user device may provide a second alert definition to the system 400. The first and second alert definitions may be stored by the system 400 and included in the data pipeline 404. In this way, the alert comparison and optimization system 400 may enable monitoring of occurrences of the alert definitions.

As an example, a first alert definition may specify a user account as an object type. The first alert definition may further specify identifying whether a number of log-ins of any user account exceeds a threshold within a particular time period. The alert comparison and optimization system 400 may thus monitor for occurrences of the first alert definition. For example, the alert comparison and optimization system 400 may utilize the data pipeline 404 to cause aggregation of information associated with each user account. The alert comparison and optimization system 400 may then determine the number of log-ins of each user account within recurring of the particular time periods. If the number of log-ins exceeds the threshold for one of the recurring particular time periods, the alert comparison and optimization system 400 may generate an alert.

As illustrated, the alert comparison and optimization system 400 may provide one or more of the generated alerts 402 to the user device 430. For example, the alert comparison and optimization system 400 may utilize a notification module (e.g., described below). The system 400 may therefore trigger notifications to specific users, specific user devices, and so on, regarding generated alerts.

As described above, the system 400 may enable a user of user device 430 to specify an alert definition. Additionally, the system 400 may determine comparisons between versions of an alert definition. As will be described in more detail below, with respect to FIGS. 8A-8C, the alert comparison and optimization system 400 can determine summary information associated with a particular alert definition. The user may then cause adjustments to be made to the particular alert definition, and the system 100 may determine summary information associated with the adjustments. Graphical representations of comparisons between the determined summary information may then be presented via the user device 430. Examples of graphical representations are illustrated in FIGS. 8B -8C. In this way, a user of user device 430 may rapidly determine which version of an alert definition is to be stored in the data pipeline 404. Thus, if a particular alert is not causing all suspicious events to be identified then the user may quickly adjust the particular alert.

Flowcharts

Figure 5:
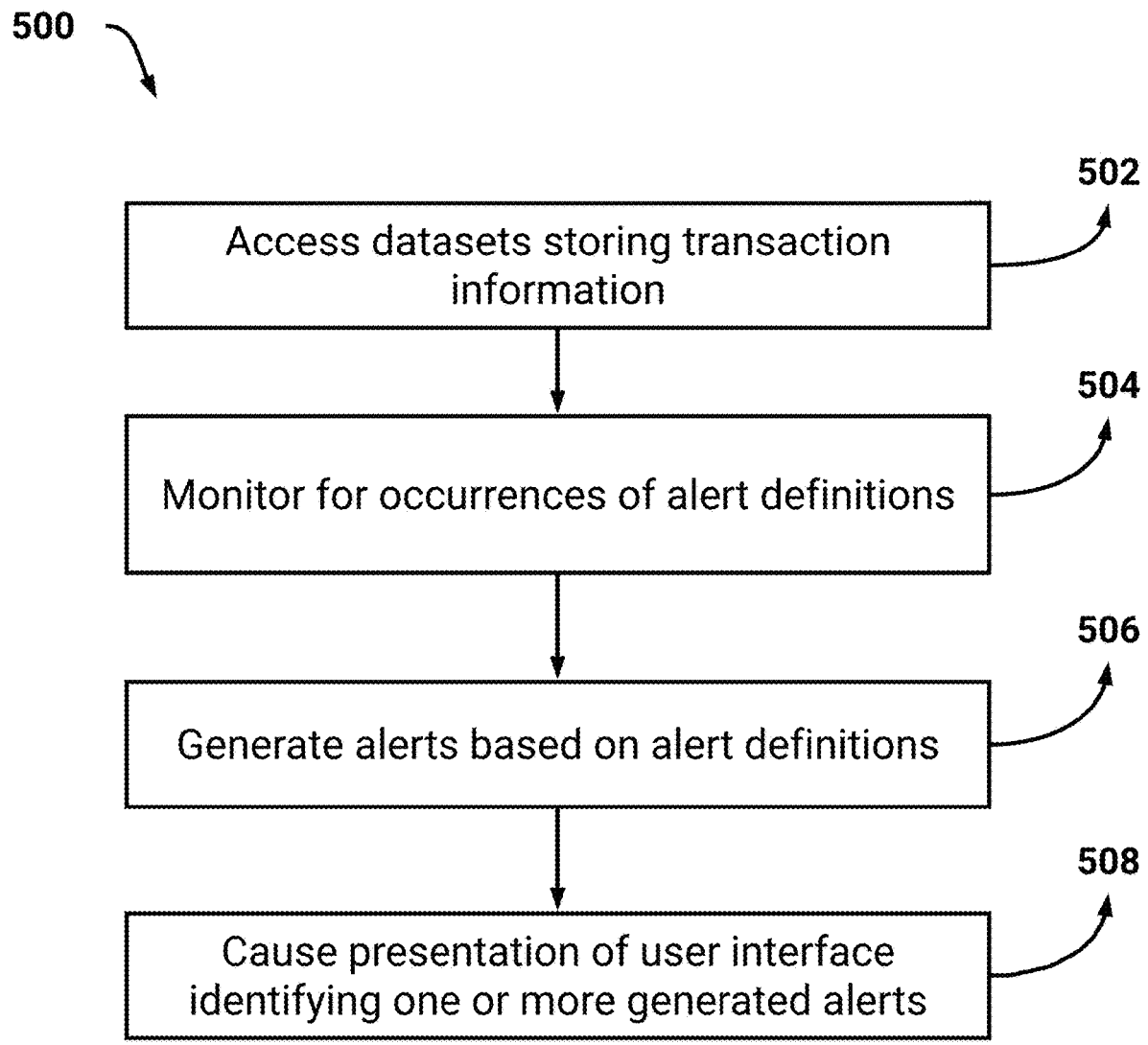
FIG. 5 illustrates a flowchart of an example process for presenting an interactive user interface identifying generated alerts.

FIG. 5 illustrates a flowchart of an example process 500 for presenting an interactive user interface identifying generated alerts. For convenience, the process 500 will be described as being performed by a system of one or more computers (e.g., the alert comparison and optimization system 400).

At block 502, the system accesses datasets. As described in FIG. 1, the system may utilize a data pipeline that indicates particular datasets to be utilized. These datasets may optionally reflect transaction information. For example, transaction information may indicate features associated with different transactions. Example features may include an indication of each entity or party included in a transaction, a timestamp associated with a transaction, an amount of money transferred in the transaction, financial institutions involved, locations implicated by the transaction, and so on.

At block 504, the system monitors for occurrences of alert definitions. The system may store alert definitions that indicate expressions to be applied to the datasets. These expressions, as described above, may be specified by a user utilizing one or more programming languages. Optionally, the user may utilize a user interface that graphically enables specification of an expression. For example, the user interface illustrated in FIG. 7C may be utilized.

As an example, an alert definition may specify an expression associated with determining an average. The expression may utilize particular information included in the datasets (e.g., values included in a particular column of a database table). The expression may further indicate a time window associated with determining an average of the particular information. For example, the particular information may include a file size associated with a requested download. In this example, a user may request downloads from a server, and the datasets may track a file size of each download. The expression may therefore cause an average download size to be determined. The average download size may be the average based on the indicated time window. Thus, the alert definition may indicate that if the determined average is greater than a threshold, then an alert is to be generated.

At block 506, the system generates alerts based on the alert definitions. As described in block 504, the system may utilize the alert definitions to generate alerts. Optionally, these generated alerts may be stored by the system. For example, the alerts corresponding to a same alert definition may be stored in a same database table. In this example, the database table may include a row for each alert. The row may indicate features of the alert (e.g., one or more objects implicated, such as users, and so on). The generated alerts may then be later reviewed, for example via a user interface.

At block 508, the system causes presentation of an interactive user interface identifying one or more generated alerts. As described above, a user may review the generated alerts. For example, FIG. 1 illustrates a graphical representation of a data pipeline. As described in FIG. 1, a user may select a particular alert included in the data pipeline. The system may then access the generated alerts, and present information associated with the particular alert. The user may then review a generated alert and assign an alert type to the generated alert. For example, the alert types may comprise a false positive, a suspicious occurrence, or a non-suspicious occurrence.

To inform a determination as to the alert type, the system may store contextual information. As an example, the generated alert may correspond to an alert definition which utilizes a user account object type. In this example, the system may access information describing the user account associated with the generated alert. The accessed information may be aggregated information associated with the user account. The accessed information may further be specified by a different user. For example, the different user may indicate whether the user account has previously acted suspicious, or been associated with alerts. Optionally, a search query may be generated to identify more information regarding a person associated with the user account. In this way, a user of the system may correctly assign an alert type to the generated alert.

Figure 6:
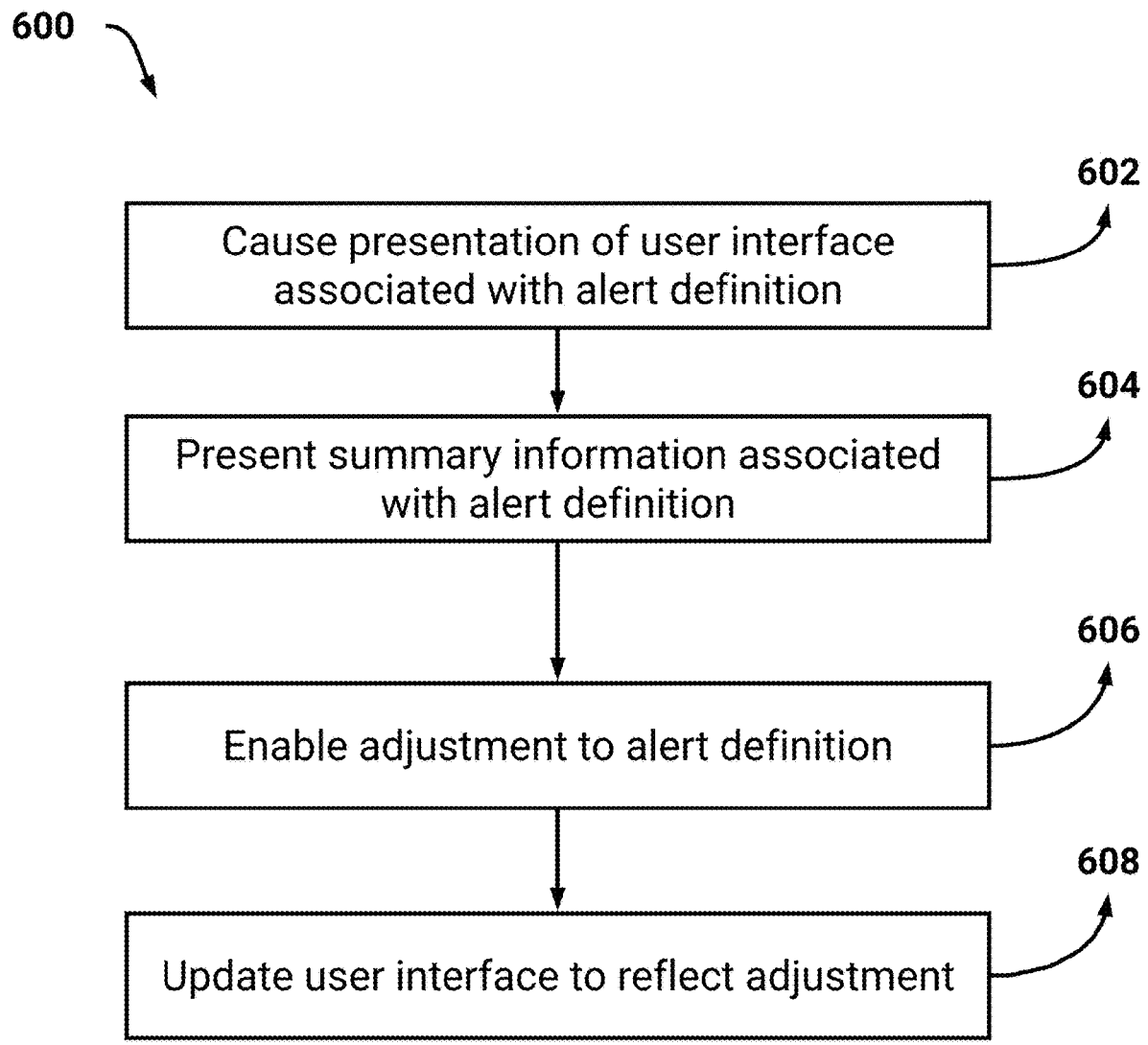
FIG. 6 illustrates a flowchart of an example process for enabling adjustments to alert definitions.

FIG. 6 illustrates a flowchart of an example process 600 for enabling adjustments to alert definitions. For convenience, the process 600 will be described as being performed by a system of one or more computers (e.g., the alert comparison and optimization system 400). Reference will be made herein to FIGS. 7A-7D.

At block 602, the system causes presentation of an interactive user interface associated with an alert. As described above, the system may monitor for occurrences of an alert definition. The alert definition may specify one or more object types and one or more expressions to be applied to underlying datasets. As will be described, the alert definition may fail to generate alerts for particular suspicious events. For example, the alert definition may benefit from inclusion of an additional expression. As another example, the alert definition may be benefit from a modification of an expression included in the alert definition. Thus, if the alert definition specifies an object type associated with a user account or entity, the alert definition may fail to generate alerts for a particular user account or entity who should be flagged. As will be described, a user may adjust the alert definition until the system generates alerts for the particular user account or entity.

Figure 7A:
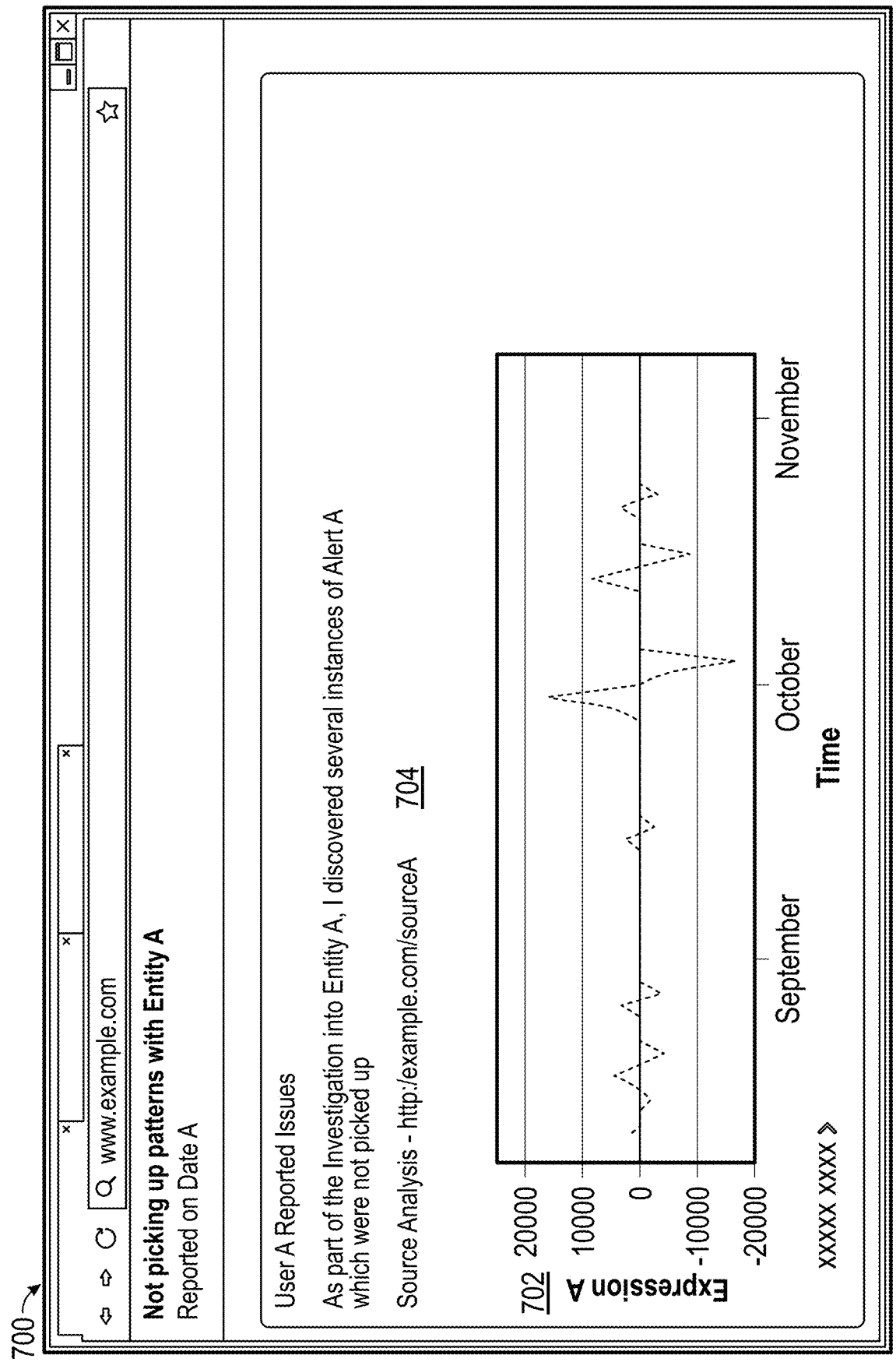
FIG. 7A illustrates an example user interface identifying an example alert definition.

FIG. 7A illustrates an example user interface 700 associated with the alert definition. User interface 700 may be presented to the user in response to user input. For example, the user may review summary information associated with the alert definition. The summary information may reflect alerts generated based on the alert definition. For example, the alerts may be characterized according to a user account or entity associated with each generated alert. The user may also view any notes generated by other users, or generated previously by the user. As will be described, in the example of FIG. 7A a particular user has generated a note indicating a failure of the alert definition with respect to a particular entity.

In this example, the particular user has noticed that the alert definition is failing to identify potentially suspicious events associated with 'Entity A'. The particular user has then reviewed an expression dataset associated with an expression specified in the alert definition (e.g., Expression A 702). The particular user caused the expression dataset to be filtered to include information associated with 'Entity A'. For example, the user may provide user input identifying filtering options associated with the expression dataset. The particular user has then determined that Expression A 702 indicates suspicious activity, which is not being captured by the current alert definition.

As illustrated in FIG. 7A, a graphical representation of the expression dataset for Expression A 702 is presented. Additionally, access to the expression dataset used to generate the graphical representation is provided (e.g., via selectable object 704). The graphical representation presents values generated by the system based on Expression A 702. These generated values are plotted by the system according to time. The particular user described above has indicated that these generated values may indicate suspicious events. For example, user interface 700 states, 'As part of the investigation into Entity A, I discovered several instances of Alert A which were not picked up.' Since, as described in the illustrated of FIG. 7A, these suspicious events did not cause the system to generate alerts, the user of the user interface 700 may cause adjustments to the associated alert definition.

At block 604, the system presents summary information with the alert definition. The user may request that summary information be presented. The summary information, as described above, may identify the alerts generated based on occurrences of the alert definition. The user may view the summary information, to identify a lack of alerts corresponding to 'Entity A'.

At block 606, the system enables adjustment to the alert definition. The user may adjust the alert definition to improve upon the generation of alerts for 'Entity A'. As will be described, the system advantageously enables the user to quickly experiment with adjustments to the alert definition. For example, the system may graphically indicate whether each adjustment improves upon the existing alert definition. The user may then cause an adjusted alert definition to be put into production, such that occurrences of the adjusted alert definition are monitored.

Figure 7B:
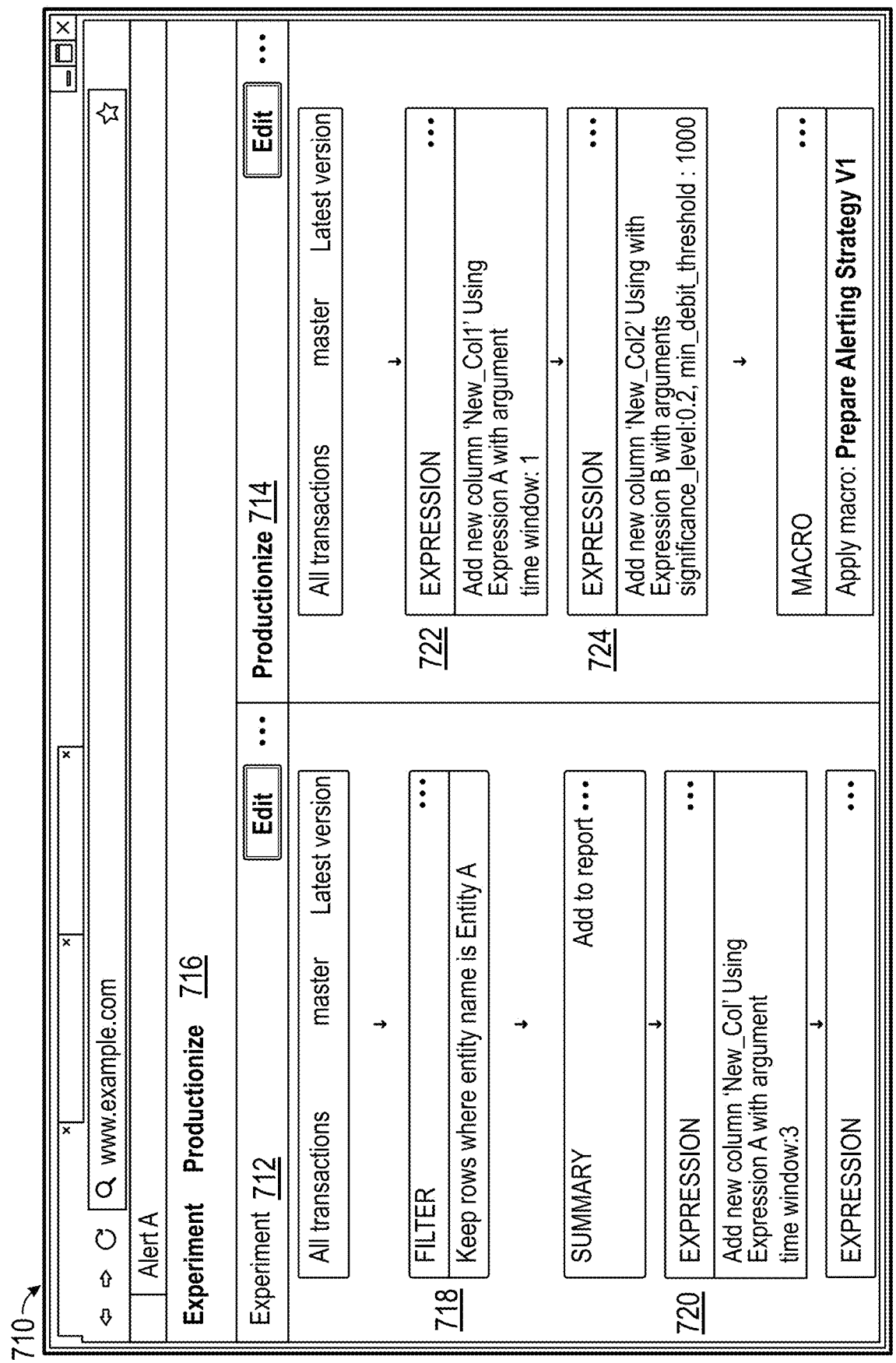
FIG. 7B illustrates an example user interface for customizing an example alert definition.

FIG. 7B illustrates an example user interface 710 for customizing an example alert definition. User interface 710 includes a first portion 712 for experimenting with adjustments to the alert definition (e.g., associated with 'Alert A'). User interface 710 further includes a second portion 714 presenting the existing alert definition (e.g., associated with 'Alert A'). As will be described, the user may adjust the alert definition via interactions with the first portion 712. Summary information associated with the adjustments may then be presented. The summary information may be utilized inform whether the adjustments are preferable to the existing alert definition. To quickly cause the existing alert definition to be updated to reflect the adjustments of the first portion 712, the user may interact with a selectable object (e.g., object 716).

The first portion 712 identifies a filter 718 being applied. As described above, the particular user noticed that alerts were not being generated for 'Entity A'. Thus, the filter 718 enables filtering according to object. In this example, the object type specified in the alert definition is an Entity type. The user of user interface 710 has therefore indicated that only information for the specific object, 'Entity A', is to be utilized.

The first portion 712 further identifies an adjusted expression 720. This adjusted expression 720 causes generation of an expression dataset using 'Expression A' with a 'time window' of '3'. Expression A will be described in more detail below, with respect to FIG. 7C. In the example of FIG. 7B, the values generated by Expression A are included to be included as values of a 'new column' (e.g., in an existing dataset, or a new expression dataset for Expression A). Additionally, an existing expression 722 (e.g., illustrated in the second portion 714) indicates a 'time window' of 1. Thus, the user of user interface 710 has adjusted the time window from the existing expression 722 to the adjusted expression 720. As described above, the time window may represent a window in which an average value is to be determined.

The second portion identifies a second expression 724 specified in the alert definition. The second expression 724 may cause generation of an expression dataset using 'Expression B' with arguments comprising a 'significance level' of .2 based on a 'min_debit_threshold' of 1000. The 'significance level' may indicate a similarity between certain information. Additionally, the 'min debit threshold' indicates that alerts are only to be generated if a certain value exceeds 1000 (e.g., debit values, for example recorded in transactions).

Figure 7C:
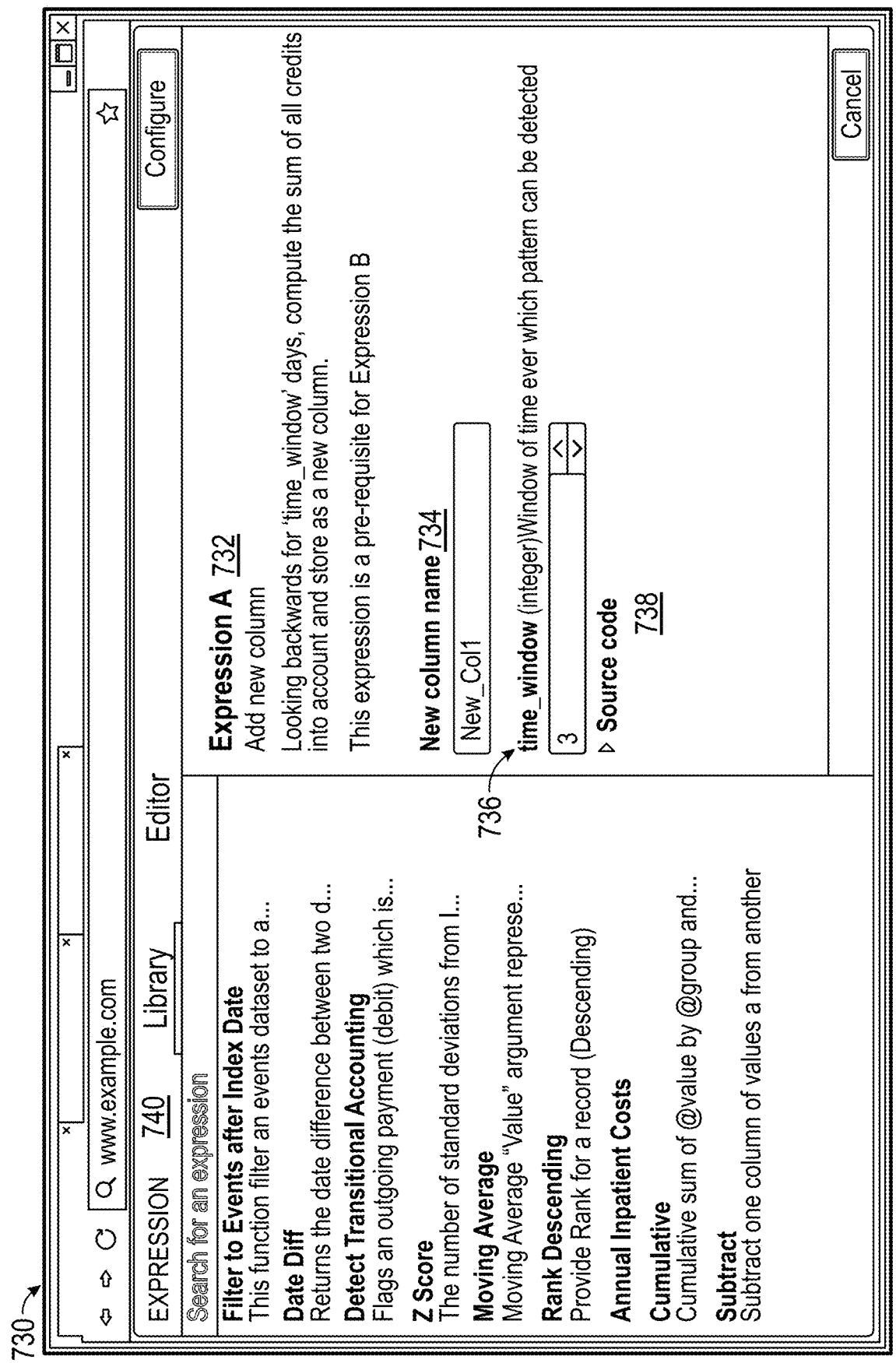
FIG. 7C illustrates an example user interface for editing an expression utilized in the example alert definition.

FIG. 7C illustrates an example user interface 730 for editing an expression 732 utilized in the example alert definition. As described in FIG. 7B, the user may adjust an expression specified in the alert definition. For example, the user may interact with user interface 710 to cause user interface 730 to be presented. As an example, the user may provide user input to the adjusted expression 720.

User interface 730 provides an overview of Expression A 732. For example, the user interface 732 indicates that Expression A 732 causes generation of a new column 734. The user of user interface 730 can select a particular column name, such that the user can easily identify it later. Additionally, user interface 732 indicates an input associated with Expression A 732 (e.g., 'time_window' 736). The user can thus select a value for this input. In this way, user interface 730 may be considered as a header file for a function labeled Expression A 732. Optionally, the user may view source code 738 related to Expression A 732. In this way, the user may directly edit the source code.

User interface 730 further includes other example Expressions 740 which may be utilized in alert definitions. These other example Expressions 740 may therefore represent templates which users may select. When specifying an alert definition, a user may optionally drag and drop expressions included in the example Expressions 740. Thus, the user may rapidly specify alert definitions, adjust an existing alert definition, and so on.

As illustrated, the user has adjusted the 'time_window' 736 to be '3'. As illustrated in FIG. 7B, the 'time_window' is '1' in the existing alert definition 722. Thus, via this user input the user has adjusted the existing alert definition. As will be described below, the system may present summary information associated with the adjusted alert definition. Thus, the user may quickly ascertain whether the 'time_window' 736 should be different from '1'.

At block 608, the system updates the user interface to reflect the adjustment. The system may update the summary information associated with the alert definition, for example as described in block 604. Examples of summary information may include an indication of a number of alerts which would be generated by the adjusted alert definition. Additionally, and as described below with respect to FIG. 7D, the system may graphically present the expression datasets. In this way, the user can identify whether the updates made to the expression datasets are preferred.

Figure 7D:
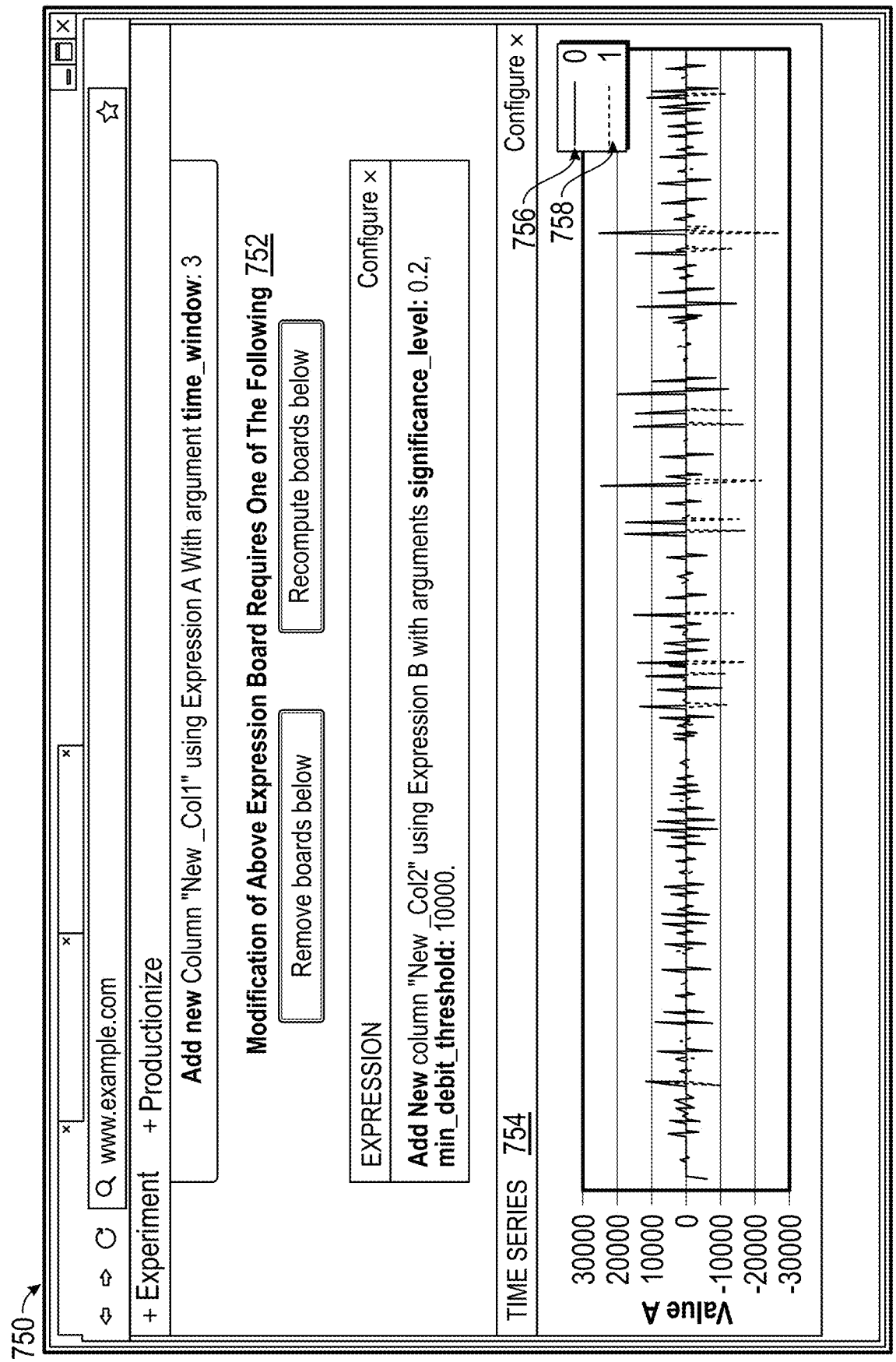
FIG. 7D illustrates an example user interface presenting summary information associated with the example alert definition.

FIG. 7D illustrates an example user interface 750 presenting summary information associated with the example alert. User interface 750 may be presented in response to the user updating the 'time window' 736 included in FIG. 7C. As illustrated in FIG. 7D, the user interface 750 includes a selectable option 752 to recompute the expressions. In this way, the user may be alerted that the expressions have been successfully updated. In some embodiments, the system may automatically trigger the recomputation of the expressions.

A time series 754 is included in user interface 750. This time series 754 may reflect the expressions as applied to 'Entity A'. For example, the first expression 720 (e.g., illustrated in FIG. 7B) may cause a sum of a certain type of value to be computed over the past '3' days. As another example, the second expression 724 (e.g., illustrated in FIG. 7B) may utilize the values computed for the first expression 720. This second expression may then generate either a '0' value 756 or a '1' value 758. The time series 754 therefore presents occurrences of the '0' value 756 or the '1' value 758 (e.g., plotted as a function of time).

The user may also view a time series determined based on the existing alert definition. For example, the first expression 720 may cause a sum of a certain type of value to be computed over the past '1' day. The user may then compare the occurrence of the '0' value 756 and '1' value 758. Based on these comparisons the user may ascertain whether the adjusted alert definition is to be implemented. For example, the '1' value 758 may indicate suspicious events. Thus, the user may quickly identify that time series 754 includes additional '1' values 758.

As will be described below, with respect to FIGS. 8A-8C, the system may additionally present comparison information between the adjusted alert definition and the existing alert definition. Thus, the system may provide graphical representations of such comparisons. In this way, the usability of adjusting and specifying alert definitions may be improved.

Figure 8A:
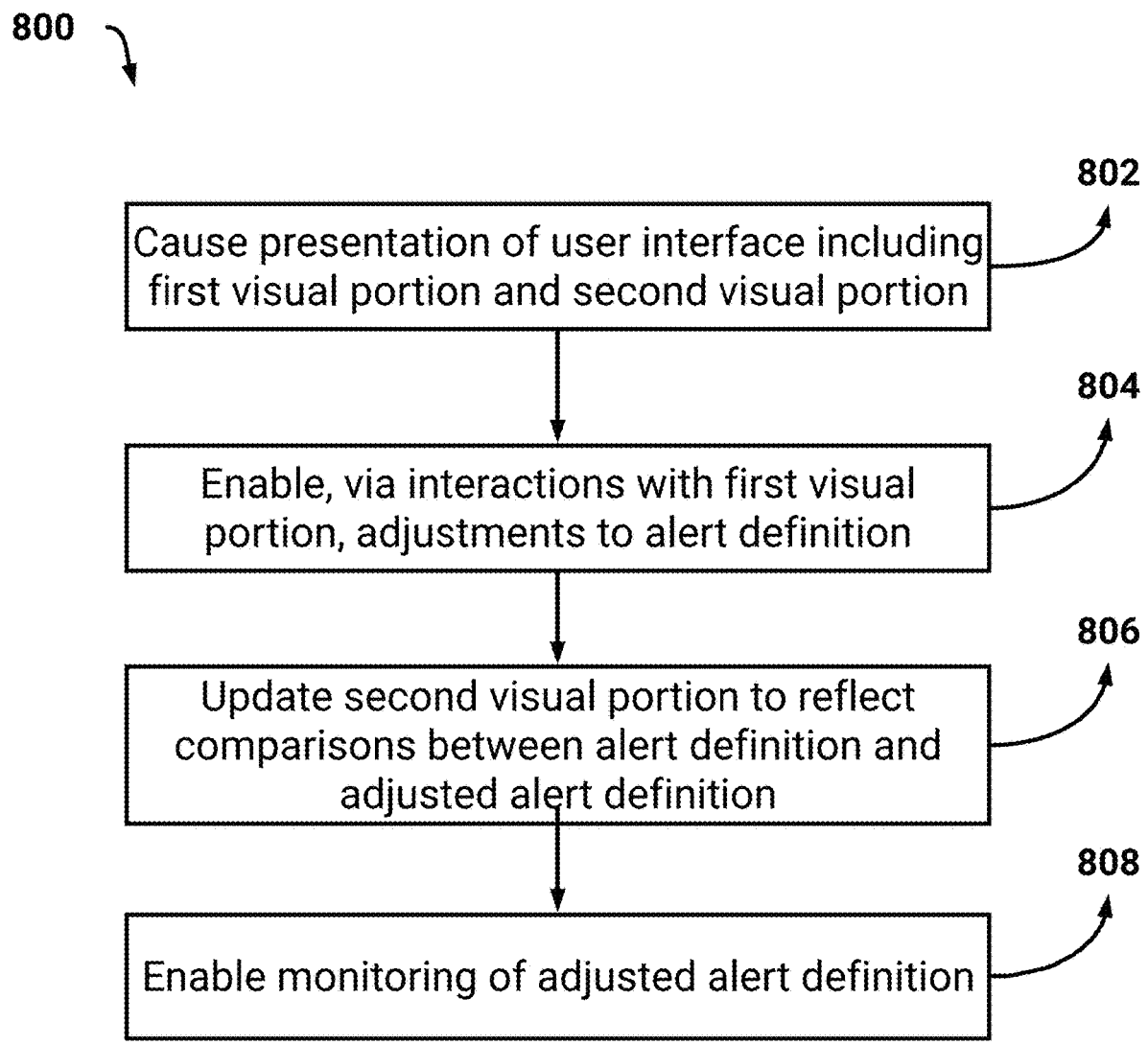
FIG. 8A illustrates an example process for monitoring an adjusted alert definition.
Figure 8B:
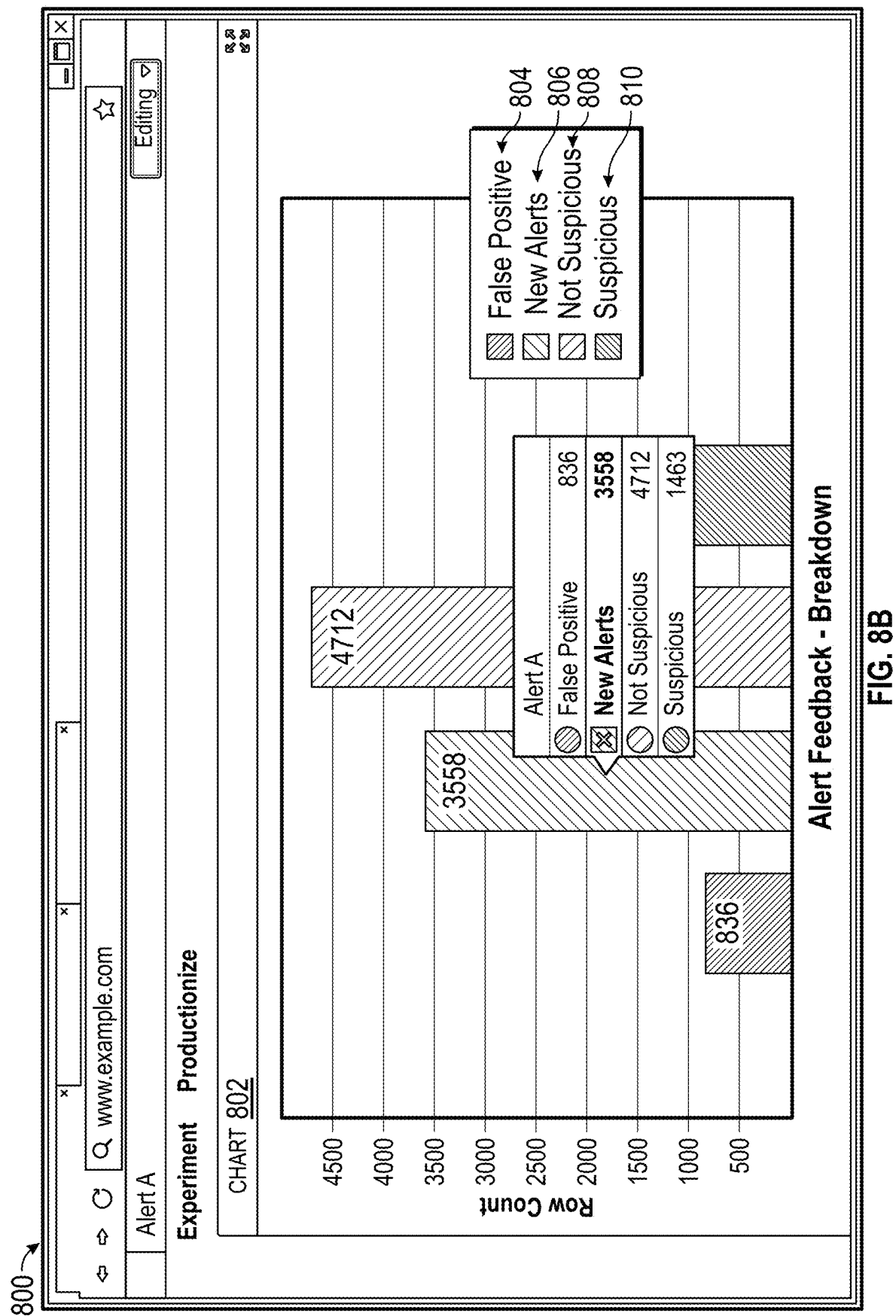
FIG. 8B illustrates an example user interface presenting comparison information.
Figure 8C:
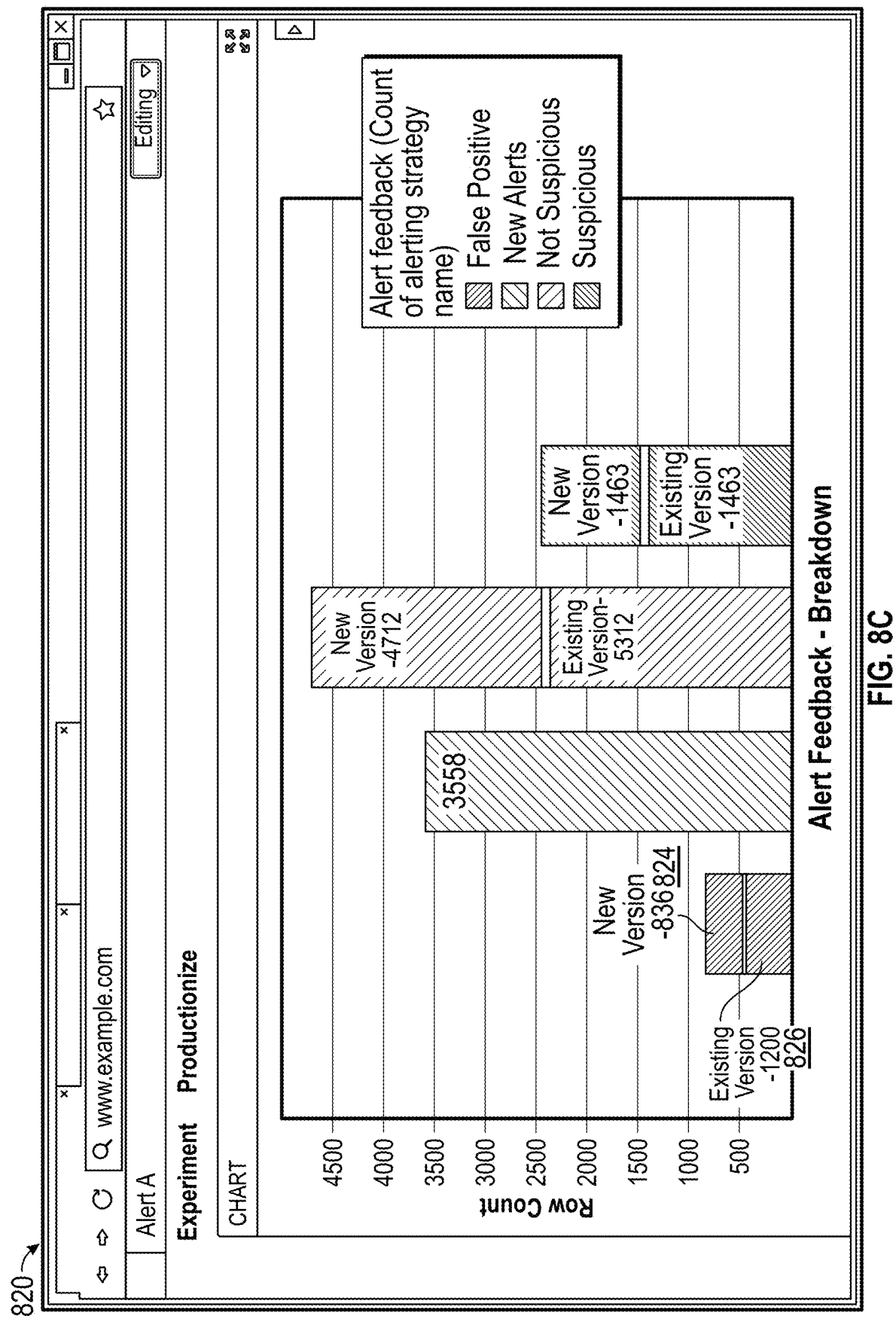
FIG. 8C illustrates another example user interface presenting comparison information.

FIG. 8A illustrates an example process 800 for monitoring an adjusted alert definition. For convenience, the process 800 will be described as being performed by a system of one or more computers (e.g., the alert comparison and optimization system 400). Reference will be made herein to FIGS. 8B-8C.

At block 802, the system causes presentation of an interactive user interface including a first visual portion and a second visual portion. At block 804, and as described in FIG. 6, the system may enable the user to experiment (e.g., via the first visual portion) with adjustments to an existing alert definition. The system may further enable the user to cause an adjusted alert definition to be put into production. For example, the system may determine occurrences of the adjusted alert definition. Thus, the adjusted alert definition may replace the existing alert definition. At block 806, and as will be described, a second visual portion may present comparison information associated with an adjusted alert definition and an existing alert definition.

For example, the second visual portion may present chart 802 and chart 822 described below. Optionally, the second visual portion may be included within a threshold distance of the first visual portion. Thus, the user may avoid having to provide additional user input to scroll or transition to the second visual portion after each adjustment made to the first visual portion. In this way, usability may be improved.

FIG. 8B illustrates an example user interface 800 presenting comparison information. As described in FIGS. 6-7D, an example alert definition (e.g., 'Alert A') may be adjusted by a user. In this way, the user may cause detection of previously undetected suspicious events related to a particular entity (e.g., 'Entity A'). As illustrated, the user interface 800 includes a graphical representation of the comparison information, which in this example is a chart 802. The chart 802 indicates a number of alerts which would be generated by the adjusted alert definition. For example, the system can trigger the determination of occurrences of the adjusted alert definition. In this way, the system may determine an extent to which the adjusted alert definition would have caused generation of alerts.

As described above, users may review generated alerts and assign respective alert types. For example, the users may indicate whether a generated alert is a false positive, is suspicious, or is not suspicious. Since alerts were previously generated by the system for the existing alert definition, the system may identify the previously generated alerts which would also have been generated by the adjusted alert definition. The system may then identify an alert type for each of the identified alerts.

As illustrated in FIG. 8B, the system has determined that the adjusted alert definition would generate '836' false positive alerts 804, '4712' not suspicious alerts 808, and '1463' suspicious alerts 810. Additionally, the system has determined that the adjusted alert definition would also have generated '4712' new alerts 806. These new alerts may represent alerts which the system has not generated based on the existing alert definition, or any other alert definition. Thus, these represent additional alerts that may warrant review by users. As described in FIG. 7D, the user of user interface 800 may have already viewed information indicating that some of the new alerts identify suspicious activity (e.g., identify suspicious events associated with 'Entity A'). Therefore, the user may be assured that at least a portion of the new alerts 806 represent suspicious events. Optionally, the user may interact with user interface 800 to cause presentation of more detailed information associated with the new alerts 806. For example, the user may view the implicated raw datasets, time series data (e.g., as illustrated in FIG. 7D), and so on.

FIG. 8C illustrates another example user interface 820 presenting comparison information. In the example of FIG. 8C, the user interface 820 indicates a comparison between the adjusted alert definition and the existing alert definition. As illustrated, the user interface 820 includes a chart 822 which indicates a quantity of each alert type for the adjusted alert definition and the existing alert definition.

For example, with respect to the alert type 'false positive', the chart 822 indicates that the adjusted alert definition 824 would generate '836' false positive alerts. In contrast, the existing alert definition 826 would generate '1200' false positive alerts. Thus, the system has determined that the adjusted alert definition 824 has generated fewer alerts which would be classified as false positives. Since a false positive may indicate that an alert definition flagged something unnecessarily, a reduced number of false positives may be preferable.

At block 808, the system enables monitoring of an adjusted alert definition. Based on the charts 802, 822, described above, the user may indicate that the adjusted alert definition is to replace the existing alert definition. Optionally via a single user input (e.g., a voice command, touchscreen input, mouse click, and so on), the user may cause the adjusted alert definition to be monitored. Thus, occurrences of the adjusted alert definition may be determined.

Machine Learning Alert Definition

Figure 9:
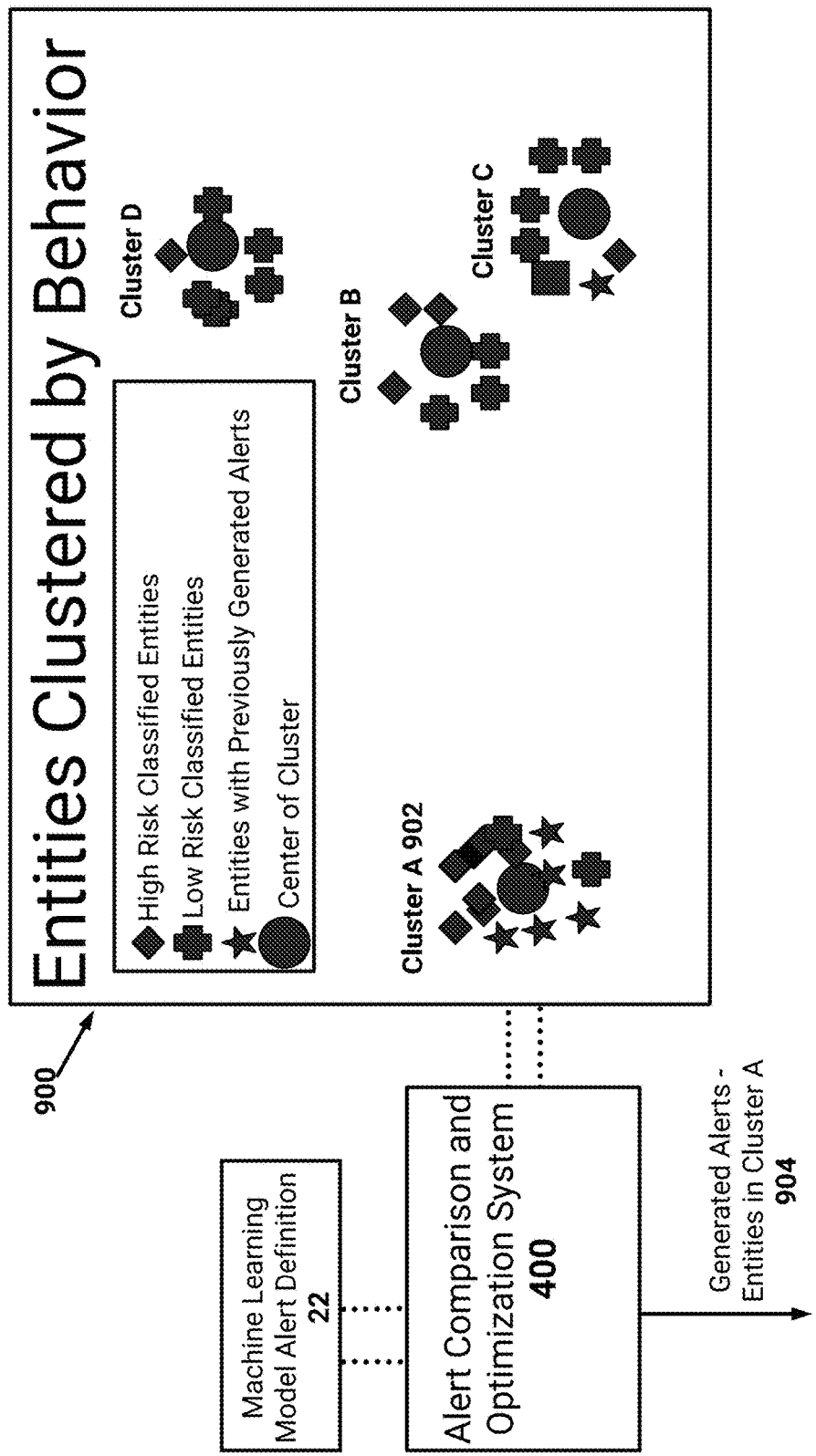
FIG. 9 illustrates a block diagram of a machine learning based alert definition.

FIG. 9 illustrates a block diagram of a machine learning model alert definition 22. As illustrated in FIG. 1, an example alert definition may utilize, or be based on, machine learning techniques. For example, a clustering algorithm, neural network, and so on, may be utilized. In this way, the user may avoid specifying specific expressions. Instead, the user may cause the system 400 to perform learning techniques to automatically identify suspicious events or behaviors.

The alert comparison and optimization system 400 may present a user interface 900 describing the information generated by the system based on the machine learning model alert definition 22. FIG. 9 illustrates an example of a certain object type (e.g., 'entities') clustered according to a machine learning technique. For example, the entities have been clustered into Clusters A-D, and each entity is indicated as either being 'high risk' or 'low risk'. FIG. 9 further indicates that specific entities for whom alerts have been previously generated are to be visually identified in the user interface 900. In this way, a user of the user interface 900 may be able to visually see that 'Cluster A' 902 should be monitored. The user may then indicate that users who are classified into 'Cluster A' 902 are to be monitored. Thus, any user which is classified as being included in 'Cluster A' 902 may have one or more alerts 904 generated. Additional alerts may be defined that utilize the clustering. For example, an alert may be generated for any user clustered into 'Cluster A' 902 and who performs certain actions.

Notification Module

In some embodiments, the alerts and/or notifications (e.g., as described above) are automatically transmitted to a user device operated by the entity associated with the alert and/or notification. The alert and/or notification can be transmitted at the time that the alert and/or notification is generated or at some determined time after generation of the alert and/or notification. When received by the device, the alert and/or notification can cause the device to display the alert and/or notification via the activation of an application on the device (e.g., a browser, a mobile application, etc.). For example, receipt of the alert and/or notification may automatically activate an application on the device, such as a messaging application (e.g., SMS or MMS messaging application), a standalone application (e.g., a data analysis application), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page so that the entity can log and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 10:
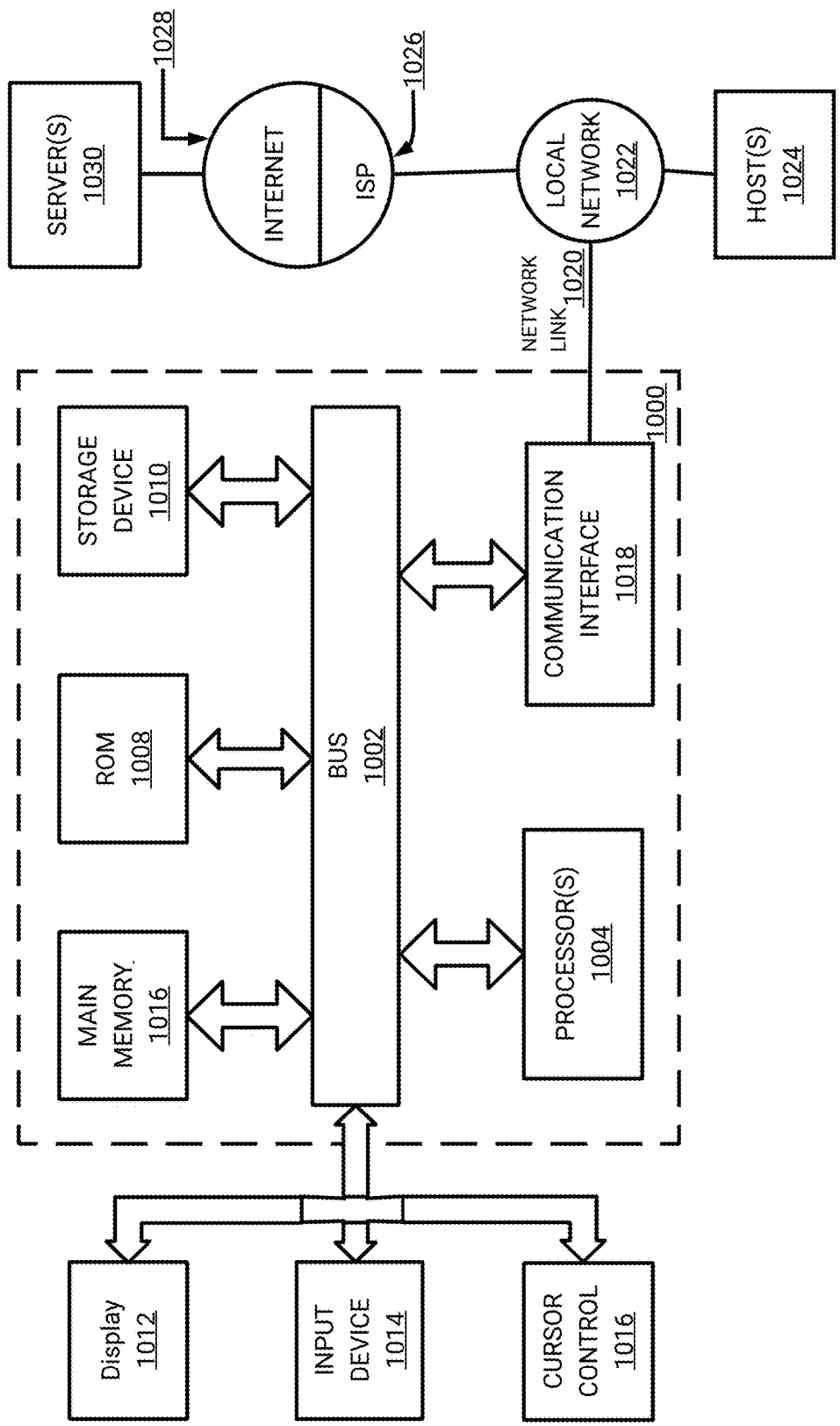
FIG. 10 illustrates a computer system with which certain methods discussed herein may be implemented.

For example, FIG. 10 is a block diagram that illustrates a computer system 1000 upon which various embodiments may be implemented. Computer system 1000 includes a bus 1002 or other communication mechanism for communicating information, and a hardware processor, or multiple processors, 1004 coupled with bus 1002 for processing information. Hardware processor(s) 1004 may be, for example, one or more general purpose microprocessors.

Computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

Computer system 1000 may be coupled via bus 1002 to a display 1012, such as a cathode ray tube (CRT) or LCD display (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1000 may include a user interface module to implement a GUI that may be stored in a mass storage device as computer executable program instructions that are executed by the computing device(s). Computer system 1000 may further, as described below, implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more computer readable program instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

Various forms of computer readable storage media may be involved in carrying one or more sequences of one or more computer readable program instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN (or WAN component to communicated with a WAN). Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method comprising:
    by a system of one or more processors,
        monitoring occurrences of existing alert definitions via applying the existing alert definitions to one or more datasets, the datasets storing information comprising a plurality of data items indicating a plurality of features, the existing alert definitions specifying respective expressions utilizing one or more of the features, wherein an occurrence of an existing alert definition indicates satisfaction of a specified expression and causes an associated alert to be generated for evaluation; and
        causing presentation of an interactive user interface configured to:

receive specification of a customized alert definition specifying an expression, and present a visual representation of a comparison between occurrences of the existing alert definitions and occurrences of the customized alert definition wherein the system determines the respective occurrences based on evaluation of one or more expression datasets which are generated based on the specified expression and the one or more datasets.

2. The computer-implemented method of claim 1, wherein the interactive user interface is segmented into a first visual portion and a second visual portion, wherein the first visual portion is configured to receive user input associated with the expression specified by the customized alert definition, and wherein the second visual portion is configured to present the visual representation.

3. The computer-implemented method of claim 1, wherein the occurrences of the existing alert definition were evaluated by one or more users and assigned respective alert types of a plurality of alert types, and wherein the occurrences of the customized alert definition have not been assigned respective alert types.

4. The computer-implemented method of claim 3, wherein the visual representation of the comparison describes an extent to which the customized alert definition increases, or decreases, the respective alert types.

5. The computer-implemented method of claim 3, wherein the interactive user interface is further configured to present information associated with a number of each alert type for the occurrences of the existing alert definition.

6. The computer-implemented method of claim 1, wherein the method further comprises:

presenting information indicating that the existing alert definition is deficient.

7. The computer-implemented method of claim 1, wherein monitoring for occurrences of alert definitions is based on applying a data pipeline to the datasets, wherein the data pipeline causes application of an ontology, and wherein the ontology causes extraction of a plurality of object types from the datasets.

8. The computer-implemented method of claim 1, wherein the customized alert definition represents a modified version of the existing alert definition.

9. A system comprising one or more processors and computer storage media storing instructions that, when executed by the system, cause the system to perform operations comprising:

monitoring occurrences of existing alert definitions via applying the existing alert definitions to one or more datasets, the datasets storing information comprising a plurality of data items indicating a plurality of features, the existing alert definitions specifying respective expressions utilizing one or more of the features, wherein an occurrence of an existing alert definition indicates satisfaction of a specified expression and causes an associated alert to be generated for evaluation; and causing presentation of an interactive user interface configured to:

receive specification of a customized alert definition specifying an expression, and present a visual representation of a comparison between occurrences of the existing alert definitions and occurrences of the customized alert definition wherein the system determines the respective occurrences based on evaluation of one or more expression datasets which are generated based on the specified expression and the one or more datasets.

10. The system of claim 9, wherein the interactive user interface is segmented into a first visual portion and a second visual portion, wherein the first visual portion is configured to receive user input associated with the expression specified by the customized alert definition, and wherein the second visual portion is configured to present the visual representation.

11. The system of claim 9, wherein the occurrences of the existing alert definition were evaluated by one or more users and assigned respective alert types of a plurality of alert types, and wherein the occurrences of the customized alert definition have not been assigned respective alert types.

12. The system of claim 11, wherein the visual representation of the comparison describes an extent to which the customized alert definition increases, or decreases, the respective alert types.

13. The system of claim 11, wherein the interactive user interface is further configured to present information associated with a number of each alert type for the occurrences of the existing alert definition.

14. The system of claim 9, wherein the operations further comprise:

presenting information indicating that the existing alert definition is deficient.

15. The system of claim 9, wherein monitoring for occurrences of alert definitions is based on applying a data pipeline to the datasets, wherein the data pipeline causes application of an ontology, and wherein the ontology causes extraction of a plurality of object types from the datasets.

16. The system of claim 9, wherein the customized alert definition represents a modified version of the existing alert definition.

17. Non-transitory computer storage media storing instructions that when executed by a system of one or more processors, cause the system to perform operations comprising:

monitoring occurrences of existing alert definitions via applying the existing alert definitions to one or more datasets, the datasets storing information comprising a plurality of data items indicating a plurality of features, the existing alert definitions specifying respective expressions utilizing one or more of the features, wherein an occurrence of an existing alert definition indicates satisfaction of a specified expression and causes an associated alert to be generated for evaluation; and causing presentation of an interactive user interface configured to:

receive specification of a customized alert definition specifying an expression, and present a visual representation of a comparison between occurrences of the existing alert definitions and occurrences of the customized alert definition wherein the system determines the respective occurrences based on evaluation of one or more expression datasets which are generated based on the specified expression and the one or more datasets.

18. The computer storage media of claim 17, wherein the interactive user interface is segmented into a first visual portion and a second visual portion, wherein the first visual portion is configured to receive user input associated with the expression specified by the customized alert definition, and wherein the second visual portion is configured to present the visual representation.

19. The computer storage media of claim 17, wherein the occurrences of the existing alert definition were evaluated by one or more users and assigned respective alert types of a plurality of alert types, and wherein the occurrences of the customized alert definition have not been assigned respective alert types.

20. The computer storage media of claim 17, wherein the operations further comprise:
 presenting information indicating that the existing alert definition is deficient.

* * * * *